US012800945B2

(12) United States Patent
Chriki et al.

(10) Patent No.: US 12,800,945 B2
(45) Date of Patent: Nov. 17, 2026

(54) METHOD AND APPARATUS FOR BONDING OF OPTICAL SURFACES BY ACTIVE ALIGNMENT

(71) Applicant: LUMUS LTD., Nes Ziona (IL)

(72) Inventors: Ronen Chriki, Lod (IL); Ido Eisenberg, Nes Ziona (IL); Eitan Ronen, Rechovot (IL); Lilya Lobachinsky, Tel Aviv (IL); Kobi Greenstein, Ness Ziona (IL); Edgar Friedmann, Sdei Avrham (IL); Elad Lavi, Ness Ziona (IL)

(73) Assignee: LUMUS LTD., New Ziona (IL)

( * ) Notice: Subject to any disclaimer, the term of this patent is extended or adjusted under 35 U.S.C. 154(b) by 305 days.

(21) Appl. No.: 18/683,649

(22) PCT Filed: Aug. 28, 2022

(86) PCT No.: PCT/IL2022/050931
§ 371 (c)(1),
(2) Date: Feb. 14, 2024

(87) PCT Pub. No.: WO2023/031913
PCT Pub. Date: Mar. 9, 2023

(65) Prior Publication Data

US 2024/0393612 A1 Nov. 28, 2024

Related U.S. Application Data

(60) Provisional application No. 63/284,661, filed on Dec. 1, 2021, provisional application No. 63/238,250, filed on Aug. 30, 2021.

(51) Int. Cl.
*G02B 27/62* (2006.01)
*B29D 11/00* (2006.01)
(Continued)

(52) U.S. Cl.
CPC .......... *G02B 27/62* (2013.01); *B29D 11/0074* (2013.01); *B29D 11/00951* (2013.01);
(Continued)

(58) Field of Classification Search
CPC ...................... G02B 27/62; G02B 5/04; G02B 2006/12114; B29D 11/0074;
(Continued)

(56) References Cited

U.S. PATENT DOCUMENTS 2,882,782 A 4/1959 Welch
5,872,663 A 2/1999 Lee et al.
(Continued)

FOREIGN PATENT DOCUMENTS

CN 107941469 A 4/2018
JP H0641208 U 10/1994
(Continued)

OTHER PUBLICATIONS

Fritz Albregtsen, "INF-GEO4310 2010 Solutions, Geometrical Optics, Part 1", Dec. 31, 2010. Available online: [https://www.studocu.com/en-za/document/university-of-limpopo/physics/solution-geometric-imaging-01-first-year/16920887?sid=578293001753161934&shared=u].

(Continued)

*Primary Examiner* — Michelle M Iacoletti
*Assistant Examiner* — Judy Dao Tran
(74) *Attorney, Agent, or Firm* — The Roy Gross Law Firm, LLC; Roy D. Gross

(57) ABSTRACT

Disclosed herein is a system for producing a composite prism having a plurality of planar external surfaces by aligning and bonding two or more prism components along bonding surfaces thereof, the system includes: an infrastructure configured to bring the bonding surfaces of the first prism component and the second prism component into
(Continued)

close proximity or contact; a controllably rotatable mechanical axis configured to align at least one first surface of the first prism component and at least one second surface of the second prism component; a light source configured to project at least one collimated incident light beam on the at least one first surface and the at least one second surface; one or more detectors configured to sense light beams reflected from the first and second surfaces; a computational module configured to determining an average actual relative orientation between the at least one first surface and the at least one second surface based on the sensed data and if a difference between the weighted average actual relative orientation and an intended relative orientation between the at least one first surface and the at least one second surface is below an accuracy threshold, determine a correction angle for the controllably rotatable mechanical axis, wherein one or more of the prism components are transparent or semi-transparent.

20 Claims, 20 Drawing Sheets

(51) Int. Cl.
*G02B 5/04* (2006.01)
*G02B 6/12* (2006.01)

(52) U.S. Cl.
CPC ................ *G02B 5/04* (2013.01); *B29D 11/00* (2013.01); *G02B 2006/12114* (2013.01)

(58) Field of Classification Search
CPC .............. B29D 11/00951; B29D 11/00; B29D 11/0073; B29D 11/00663; G01B 11/26
See application file for complete search history.

(56) References Cited

U.S. PATENT DOCUMENTS

| | | | | |
|---|---|---|---|---|
| 6,580,529 | B1 | 6/2003 | Amitai et al. | |
| 6,671,100 | B1 | 12/2003 | McRuer | |
| 8,432,614 | B2 | 4/2013 | Amitai | |
| 8,548,290 | B2 | 10/2013 | Travers et al. | |
| 8,913,865 | B1 | 12/2014 | Bennett | |
| 9,791,703 | B1 | 10/2017 | Vallius et al. | |
| 10,962,787 | B1 | 3/2021 | Lou et al. | |
| 11,667,004 | B2 | 6/2023 | Maziel et al. | |
| 2003/0063293 | A1 | 4/2003 | Kitabayashi et al. | |
| 2005/0152051 | A1 * | 7/2005 | Choi .................. | G02B 27/0972 359/837 |
| 2005/0190683 | A1 * | 9/2005 | Ando ....................... | G02B 5/04 369/121 |
| 2007/0002911 | A1 * | 1/2007 | Sharma ................... | H01S 5/141 372/29.022 |
| 2007/0091445 | A1 | 4/2007 | Amitai | |
| 2009/0003406 | A1 | 1/2009 | Sjogren et al. | |
| 2009/0034069 | A1 | 2/2009 | Hsu | |
| 2015/0253185 | A1 | 9/2015 | Richards et al. | |
| 2015/0338655 | A1 | 11/2015 | Sawada et al. | |
| 2017/0045743 | A1 | 2/2017 | Dobschal et al. | |
| 2017/0199384 | A1 | 7/2017 | Yeoh et al. | |
| 2017/0276604 | A1 * | 9/2017 | Okumura ........... | G01N 21/6428 |
| 2017/0363794 | A1 | 12/2017 | Wan et al. | |
| 2017/0363799 | A1 | 12/2017 | Ofir et al. | |
| 2017/0371160 | A1 | 12/2017 | Schultz | |
| 2018/0059019 | A1 | 3/2018 | Chouaib et al. | |
| 2018/0210202 | A1 | 7/2018 | Danziger | |
| 2018/0246335 | A1 | 8/2018 | Ushakov | |
| 2018/0284448 | A1 | 10/2018 | Matsuki et al. | |
| 2019/0227215 | A1 | 7/2019 | Danziger et al. | |
| 2019/0293838 | A1 | 9/2019 | Haba et al. | |
| 2020/0292733 | A1 | 9/2020 | Lee et al. | |
| 2021/0033774 | A1 | 2/2021 | Tanaka | |
| 2023/0063646 | A1 | 3/2023 | Eisenberg | |
| 2023/0366675 | A1 | 11/2023 | Eisenberg | |

FOREIGN PATENT DOCUMENTS

| | | | | | |
|---|---|---|---|---|---|
| JP | H09304036 | A | | 11/1997 | |
| JP | 2890423 | B2 | | 5/1999 | |
| JP | H11173825 | A | * | 7/1999 | ............. G01B 11/26 |
| JP | 2019117363 | A | * | 7/2019 | ............... G02B 5/04 |
| WO | 2019131277 | A1 | | 7/2019 | |
| WO | 2020148574 | A1 | | 7/2020 | |

OTHER PUBLICATIONS

PCT International Search Report and Written Opinion for International Application No. PCT/IL2022/050931, mailed Jan. 22, 2023, 10pp.

* cited by examiner

METHOD AND APPARATUS FOR BONDING OF OPTICAL SURFACES BY ACTIVE ALIGNMENT

CROSS REFERENCE TO RELATED APPLICATIONS

This application is a National Phase of PCT Patent Application No. PCT/IL2022/050931 having International filing date of Aug. 28, 2022, which claims the benefit of priority of U.S. Provisional Patent Application Nos. 63/238,250, filed Aug. 30, 2021 and 63/284,661, filed Dec. 1, 2021, the contents of which are all incorporated herein by reference in their entirety.

TECHNICAL FIELD

The present disclosure relates generally to methods and systems for bonding and aligning optical surfaces.

BACKGROUND

A mechanical or optical element may contain two or more flat reflective surfaces that should have a specific relative position or angular orientation between them. The manufacturing of such elements may be technically challenging and expensive, particularly in cases where high accuracy is required. There exists an unmet need in the art for easily implementable techniques for bonding and accurately aligning optical elements.

SUMMARY

Aspects of the disclosure, according to some embodiments thereof, relate to methods and systems for producing complex prisms by bonding two or more prisms using active alignment. More specifically, but not exclusively, aspects of the disclosure, according to some embodiments thereof, relate to generating complex prism structures with high angular accuracy between components. This is of particular interest for producing refractive complex waveguide structures and for assuring quality thereof.

Thus, according to an aspect of some embodiments, there is provided a system for producing a composite prism having a plurality of planar external surfaces by aligning and bonding two or more prism components along bonding surfaces thereof, the system includes: an infrastructure configured to bring the bonding surfaces of the first prism component and the second prism component into close proximity or contact; a controllably rotatable mechanical axis configured to align at least one first surface of the first prism component and at least one second surface of the second prism component; a light source configured to project at least one collimated incident light beam on the at least one first surface and the at least one second surface; one or more detectors configured to sense light beams reflected from the first and second surfaces; a computational module configured to determining an average actual relative orientation between the at least one first surface and the at least one second surface based on the sensed data and, if a difference between the weighted average actual relative orientation and an intended relative orientation between the at least one first surface and the at least one second surface is below an accuracy threshold, determine a correction angle for the controllably rotatable mechanical axis, wherein one or more of the prism components are transparent or semi-transparent. According to some embodiments, the computational module is further configured to provide instructions to a controller functionally associated with the rotatable mechanical axis to automatically correct the angle between the first and second surfaces.

According to an aspect of some embodiments, there is provided a method for producing a composite prism having a plurality of planar external surfaces by aligning and bonding two or more prism components along bonding surfaces thereof, the method includes the stages of: bringing the bonding surfaces of the first prism component and the second prism component into close proximity or contact; aligning at least one first surface of the first prism component and at least one second surface of the second prism component; projecting at least one collimated incident light beam on the at least one first surface and the at least one second surface; sensing light beams reflected from the at least one first surface and the at least one second surface; based on the sensed data, determining an average actual relative orientation between the at least one first surface and the at least one second surface; and joining, using a controllably rotatable mechanical axis, the first and second prism components along their bonding surfaces if the difference between the weighted average actual relative orientation and an intended relative orientation between the at least one first surface and the at least one second surface is below an accuracy threshold, wherein one or more of the prism components are transparent or semi-transparent.

According to some embodiments, the step of joining may include one or more of bonding, curing, applying pressure, heating and/or mechanically tightening.

According to some embodiments, the method may further include realigning the first and second surfaces if the difference between the actual relative orientation and the intended relative orientation between the first and second surfaces is above the accuracy threshold.

According to some embodiments, the method may further include repeating the stages of aligning the first and second surfaces, projecting the at least one incident light beam, and determining the actual relative orientation between the first and second surfaces if the difference between the actual relative orientation and the intended relative orientation between the first and second surfaces is above the accuracy threshold.

According to some embodiments, an adhesive may be applied between the bonding surfaces prior to the stage of aligning the first and second surfaces, and, if the difference between the actual relative orientation and an intended relative orientation between the first and second surfaces is below the accuracy threshold, the first prism component and the second prism component are cured along the bonding surfaces thereof. The adhesive may be applied between the bonding surfaces prior to the stage of aligning the first and second surfaces, and, if the difference between the actual relative orientation and an intended relative orientation between the first and second surfaces is below the accuracy threshold, the first prism component and the second prism component are cured along the bonding surfaces thereof.

According to some embodiments, the at least one incident light beam may include a first incident light beam and a second incident light beam directed at a first angle and a second angle relative to the first surface and the second surface, respectively. The at least one incident light beam may be monochromatic. According to some embodiments, each of the at least one incident light beam may be a laser beam. According to some embodiments, the at least one incident light beam may be coherent.

According to some embodiments, the light beams reflected from the first surface and the second surface are focused onto a photosensitive surface, and wherein the difference between the actual relative orientation and the intended relative orientation between the first and second surfaces is derived from locations of a first and second spot formed on the photosensitive surface by the light reflected from the first surface and the second surface, respectively. The incident light beams may be generated using an autocollimator and wherein the photosensitive surface is a photosensitive surface of an image sensor of the autocollimator. The incident light beams may be coherent and the difference between the actual relative orientation and the intended relative orientation between the first and second surfaces may be derived from measuring of an interference pattern of the reflected light beams.

According to some embodiments, the first and second surfaces are intended to be contiguous.

According to some embodiments, the first and second surface are intended to be oriented perpendicularly, or substantially perpendicularly, to one another.

According to some embodiments, an angle between the first and second surface is intended to be less than about 20 Deg. The first and second surface is intended to be less than about 10 Deg.

According to some embodiments, the first and second surface are intended to be parallel or substantially parallel to each other.

According to some embodiments, the first and second surfaces are external surfaces. According to some embodiments, at least one of the first surface and the second surface is an internal facet.

According to some embodiments, the at least one second surface may include a plurality of internal facets nominally co-parallel, wherein the projecting of the at least one collimated incident light beam and the sensing of the light beams are separately performed on the first surface and each one of the internal facets.

According to some embodiments, the first prism component and/or the second prism component may include joined sub-prisms defining therebetween an internal facet, and/or the first prism and and/or the second prism components include an embedded internal facet.

According to some embodiments, the first and/or second surfaces are coated with a reflective coating.

According to some embodiments, the second surface is an embedded internal facet, and wherein the method may further include an initial stage of submerging the composite prism in an immersive medium having a refractive index equal the second prism component; and/or the second prism component may include a first sub-prism and a second sub-prism, which are joined, wherein the second surface is an internal facet defined by a boundary between the first sub-prism and the second sub-prism, and wherein the method may further include an initial stage of immersing the composite prism in a medium having a refractive index equal to the first sub-prism.

According to some embodiments, the at least one incident light beam is projected normally to a surface of the immersive medium.

According to some embodiments, the second prism component may include the first sub-prism and the second sub-prism, wherein the at least one incident light beam includes a first incident light beam and a second incident light beam propagated onto the first surface and the second surface, respectively, and wherein the second incident light beam traverses the first sub-prism to reach the second surface.

According to some embodiments, the method may further include determining a relative position of the first prism component with respect to the second prism component.

According to some embodiments, the determination of the relative position of the first prism component with respect to the second prism component is performed using one or more cameras. According to some embodiments, the determination of the relative position of the first prism component with respect to the second prism component is performed using one or more cameras.

According to some embodiments, the first surface of the first prism component and the second surface of the second prism component are intended to be non-parallel, wherein the incident light beam is projected at a substantially perpendicular direction to the first surface of the first prism component, and wherein a mediating optical element is utilized to direct a portion of the incident light beam onto the second surface of the second prism component so as to impinge thereon substantially normally thereto. The mediating optical element is selected from a group consisting of a pentaprism, right-angled prism, a set of mirrors, and a diffracting optical grating or element.

According to some embodiments, the collimated incident light beam is a polarized light.

According to some embodiments, the method may further include placing between the bonding surfaces of the first and the second prisms, two additional sub-prisms and aligning the first surface of the first prism and the second surface of the second prism utilizing the two additional sub-prisms, wherein each of the additional sub-prisms has two non-parallel surfaces defining two different angles, thereby allowing to controllably set an angle between the bonding surfaces of the first and the second prism components.

According to an aspect of some embodiments, there is further provided a system for measuring and/or validating an orientation between two non-parallel surfaces of an optical element, the system includes: an infrastructure configured to position an optical element including a first surface and a second surface, which are set at an angle with respect to one another; a light source configured to project at least one collimated incident light beam having a first and a second sub-beams such that the first sub-beam impinges substantially normally on the first surface and the second sub-beam impinges substantially normally on the second surface following passage through a mediating optical element; one or more detectors configured to sense light reflected from the first surface and light reflected from the second surface following repassage through the mediating optical element; and a computational module configured to determine an actual relative orientation between the first and second surfaces based on the sensed data.

According to an aspect of some embodiments, there is provided a method for measuring and/or validating an orientation between two non-parallel surfaces of an optical element, the method includes: providing an optical element including a first surface and a second surface, which are set at an angle with respect to one another; projecting at least one collimated light beam, including a first sub-beam and a second sub-beam, such that the first sub-beam impinges substantially normally on the first surface and the second sub-beam impinges substantially normally on the second surface following passage through a mediating optical element; sensing light reflected from the first surface and light reflected from the second surface following repassage through the mediating optical element; and based on the sensed data, determining an actual relative orientation between the first surface and the second surface.

According to some embodiments, the angle between the first surface and the second surface is about 90°. According to some embodiments, the angle between the first surface and the second surface is between about 20° and about 90°. According to some embodiments, the angle between the first surface and the second surface is between about 30° and about 70°.

According to some embodiments, the first surface and the second surface are external surfaces.

According to some embodiments, the first surface is an external surface, and the second surface is an internal surface.

According to some embodiments, the optical element may further include a first plurality of internal surfaces, nominally parallel to the first surface, and the method may further include applying the steps of projecting, sensing and determining with respect to each of the first plurality of internal surfaces and the second surface.

According to some embodiments, the method may further include an average actual relative orientation between the second surface and the first surface and the first plurality of internal surfaces.

According to some embodiments, the optical element may further include a second plurality of internal surfaces, nominally parallel to the second surface and wherein the method may further include applying the steps of projecting, sensing and determining with respect to each of the second plurality of internal surfaces and the first surface.

According to some embodiments, the method may further include computing an average actual relative orientation between the second surface and the first surface and the first plurality of internal surfaces.

According to an aspect of some embodiments, there is further provided a system for measuring and/or validating an orientation between two nominally parallel, or nominally close to parallel, and laterally overlapping surfaces of an optical element, the system includes: an infrastructure configured to position an optical element, the optical element includes a first surface and a second surface, which are nominally parallel, or nominally close to parallel, and are laterally overlapping, wherein one of the first surface and the second surface has substantially higher reflectivity than the other; a light source configured to non-simultaneously project an s-polarized collimated light beam and a p-polarized collimated light beam, directed so as to be incident substantially at Brewster's angle relative to the surface having the substantially higher reflectivity, thereby allowing to distinguish light reflected from the first surface from light reflected from the second surface; one or more detectors configured to sense light reflected from the first surface and light reflected from the second surface; and a computational module configured to determine an actual relative orientation between the first surface and the second surface based on the sensed data.

According to an aspect of some embodiments, there is provided a method for measuring and/or validating an orientation between two nominally parallel, or nominally close to parallel, and laterally overlapping surfaces of an optical element, the method includes: providing an optical element including a first surface and a second surface, which are nominally parallel, or nominally close to parallel, and are laterally overlapping, wherein one of the first surface and the second surface has substantially higher reflectivity than the other; non-simultaneously projecting an s-polarized collimated light beam and a p-polarized collimated light beam, directed so as to be incident substantially at Brewster's angle relative to the surface having the substantially higher reflectivity, thereby allowing to distinguish light reflected from the first surface from light reflected from the second surface; sensing light reflected from the first surface and light reflected from the second surface; and based on the sensed data, determining an actual relative orientation between the first surface and the second surface.

According to some embodiments, the first surface is an external surface, and the second surface is an internal surface.

According to some embodiments, the optical element may further include a first plurality of internal surfaces, nominally parallel to the first surface, and wherein the method may further include applying the steps of projecting, sensing and determining with respect to each of the first plurality of internal surfaces and the second surface.

According to some embodiments, the method may further include computing an average actual relative orientation between the second surface and the first surface and the first plurality of internal surfaces.

According to some embodiments, an angle nominally close to parallel is smaller than about 5 arc minutes.

According to an aspect of some embodiments, there is further provided a system for measuring and/or validating an orientation between two nominally parallel, or nominally close to parallel, and laterally overlapping surfaces of an optical element, the system includes: an infrastructure including a wedge prism and a shutter assembly, the infrastructure being configured to place the wedge prism on an external first surface of an optical element which is to be inspected, the optical element further includes an external or internal second surface, which is nominally parallel, or nominally close to parallel to the first surface, and laterally overlapping therewith; a light source configured to project a collimated incident light beam directed at the optical element and the wedge prism; a shutter assembly configured be controllably switched at least between a first state and a second state, in the first state the shutter assembly blocks light from directly impinging on the first surface of the optical element, and in the second state the shutter assembly blocks light from impinging on the wedge prism; one or more light detectors configured to sense light directly reflected from the first surface and light reflected from the second surface following passage through the wedge prism; and a computational module configured to determine an actual angle between the first surface based on first sensed data and second sensed data, the first sensed data being obtained by the one or more light detectors when the shutter assembly is in a first state and the second sensed data being obtained by the one or more light detectors when the shutter assembly is in a second state.

According to an aspect of some embodiments, there is provided a method for measuring and/or validating an orientation between two nominally parallel, or nominally close to parallel, and laterally overlapping surfaces of an optical element, the method includes: providing an optical element including an external first surface and an external or internal second surface, which are nominally parallel, or nominally close to parallel, and are laterally overlapping; placing a wedge prism on the first surface, wherein the wedge prism has the same refractive index as the optical element; projecting a collimated incident light beam on a top surface of the wedge prism, such that the second surface of the optical element and the top surface of the wedge reflect light, while blocking light from being reflected from the first surface; sensing light reflected from the second surface following re-passage through the wedge prism; projecting the collimated incident light beam on the first surface, such first surface reflects light, while blocking light from being reflected from the top surface of the wedge and from the second surface; sensing light reflected from the first surface; and based on the sensed data, determining an actual angle between the first surface and the second surface.

According to some embodiments, an index matched liquid is placed between the wedge prism and the optical element.

According to some embodiments, the method may further include using a shutter assembly to selectively block light from impinging directly on the first surface or from impinging on the top surface of the wedge prism.

According to some embodiments, the second surface is an internal surface.

According to some embodiments, the optical element includes a composite prism. According to some embodiments, the optical element includes a waveguide structure. According to some embodiments, the optical element includes a composite prism and a waveguide structure.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the Figures.

DETAILED DESCRIPTION

Figure 1A:
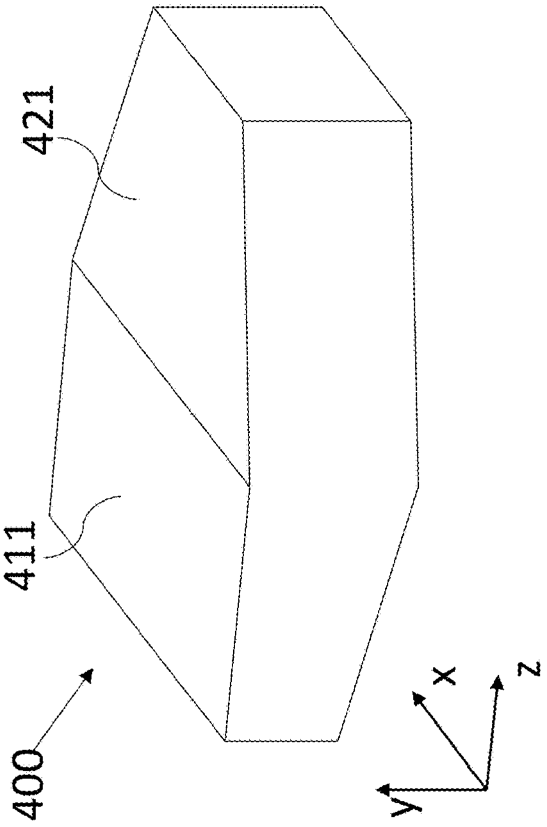
FIG. 1A schematically depicts an isometric view of an exemplary complex prism, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value. In particular, it is to be understood that the terms "about equal" and "equal to about" also cover exact equality.

As used herein, according to some embodiments, the terms "substantially" and "about" may be interchangeable.

For case of description, in some of the figures a three-dimensional cartesian coordinate system is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In the figures, optional elements and optional stages (in flowcharts) are delineated by a dashed line.

Throughout the description, vectors are represented by lowercase, upright letters in boldface (e.g. v).

Figure 1B:
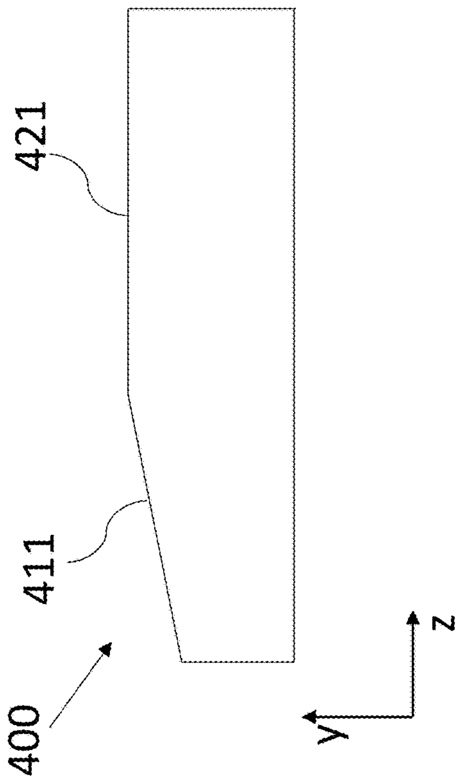
FIG. 1B schematically depicts a side view of the complex prism of FIG. 1A, according to some embodiments.
Figure 1C:
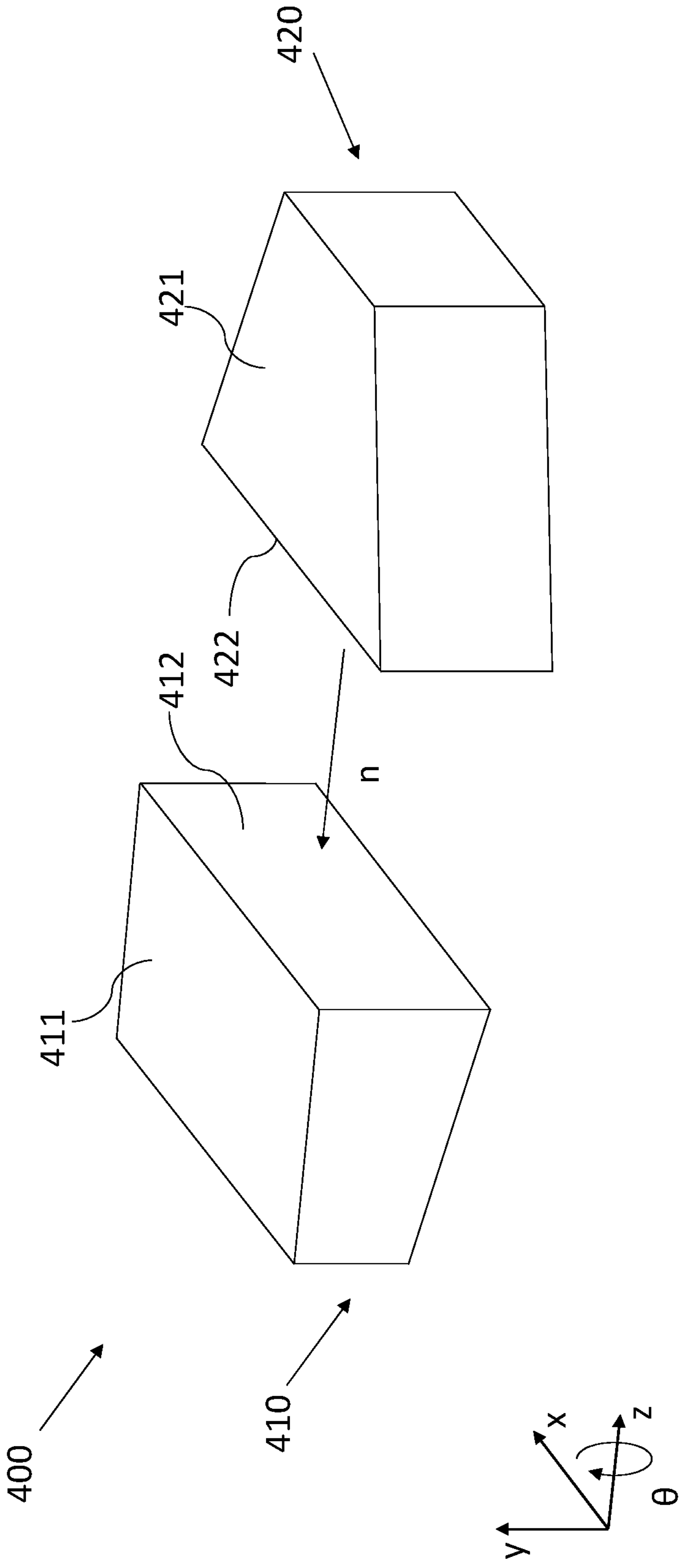
FIGS. 1C and 1D schematically depict the bonding by active alignment of the complex prism of FIG. 1A, according to some embodiments.
Figure 1D:
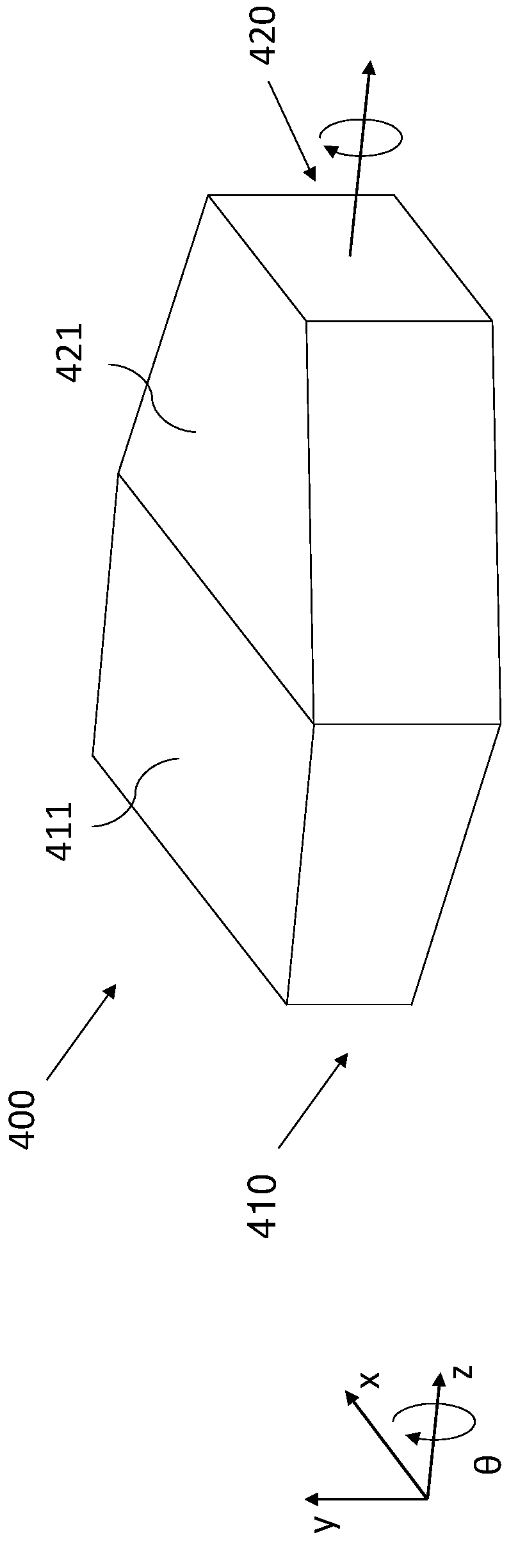

Reference is now made to FIGS. 1A-1D, which schematically depict different views of an exemplary complex prism 400, according to some embodiments. FIG. 1A schematically depicts an isometric view of exemplary complex prism 400, according to some embodiments. FIG. 1B schematically depicts a side view of complex prism 400, according to some embodiments. FIGS. 1C and 1D schematically depict the bonding by active alignment of complex prism 400, according to some embodiments.

Complex prism 400 is constructed by bonding two sub-prisms, sub-prism 410 and sub-prism 420. According to this example, it is desired that surface 411 of sub-prism 410 and surface 421 of sub-prism 420 will be oriented at an accurate angle with respect to one another. As demonstrated in FIG. 1C, such a prism can be produced by bonding surfaces 412 of sub-prism 410 and surface 422 of sub-prism 420 with high accuracy. Such high accuracy bonding can be achieved, in accordance with some embodiments, by attaching the two surfaces 412 and 422, aligning (by rotation around z axis one or both sub-prisms) the prisms 410 and 420 so as to set and optimize the relative angular orientation between surfaces 411 and 421, and then clamping the relative orientation between prisms 410 and 420. According to some embodiments, the bonding may be achieved, for example, by placing a thin layer of an adhesive substance between two external surfaces 412 and 422, aligning prisms 410 and 420 such that the required angle between surfaces 411 and 421 is achieved, and finally solidifying the adhesives, for example, using methods such as UV curing or heating. According to additional or alternative embodiments, bonding prisms 410 and 420 together may be accomplished using a mechanical axis that allows mechanical rotation (rotation around z axis one or both sub-prisms), and then tightening the two sub-prisms mechanically.

According to some embodiments, the alignment of prisms 410 and 420 may be performed in an iterative process of measurement and correction of the relative orientation between surfaces 411 and 421. According to additional or alternative embodiments, the alignment of prisms 410 and 420 may be performed by measuring the relative orientation in real time, while correcting the relative orientation of the surfaces 411 and 421.

According to some embodiments, measurement of the angle between the two surfaces may be made optically as will be demonstrated in FIGS. 3A and 3B hereinbelow.

FIGS. 1C and 1D schematically depict the bonding by active alignment of complex prism 400, according to some embodiments. A coordinate axis is defined herein such that bonded surfaces 412 and 422 lie in the x-y plane. It is noted that since the two sub-prisms 410 and 420 must be closely attached and bonded to one another, the relative orientation between surfaces 411 and 421 can only be adjusted by rotating the prisms around the normal (n) to bonding surfaces 412 and 422. Accordingly, there is no control of the angular orientation between sub-prisms 410 and 420 around the x or y axis, and only the angular orientation between the prisms in the x-y planes can be adjusted (i.e. the angle between the normals of the bonding surfaces 412 and 422 can only be adjusted in the x-y planes). The angle between the two surfaces can be decomposed to its projection on the x-y plane and its projection onto the y-z plane. In cases where the requirements for high accuracy for the angular orientation of surfaces 411 and 421 is only in the x-y plane, sub-prisms 410 and 420 can be made with very loose tolerances; whereas in cases where the requirement for high accuracy for the angular orientation between sub-prisms 410 and 420 is also in the x-z or y-z planes, prisms 410 and 420 must be produced with high accuracy between surfaces 411 and 412 and between surfaces 421 and 422.

Figure 1E:
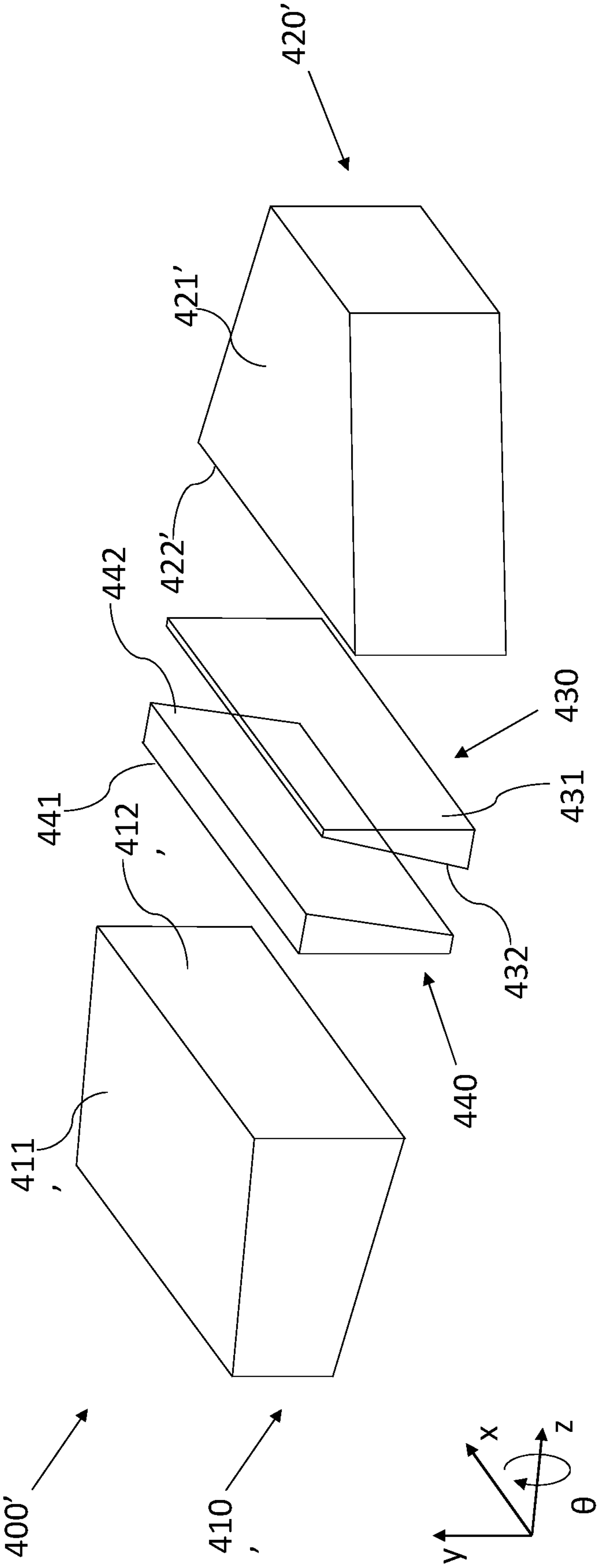
FIG. 1E schematically depicts bonding by active alignment of a complex prism using two mediating prisms, according to some embodiments.

Alternatively, according to some embodiments, sub-prisms (for example, two, three, four or more) may be placed between two bonding surfaces of two sub-prisms to facilitate active accurate angular alignment in both x-y and y-z planes of two respective surfaces of the two sub-prisms. Reference is now made to FIG. 1E, which schematically depicts an example of bonding by active alignment of a complex prism of using two mediating prisms, according to some embodiments. In this example, complex prism 400' should be formed such that the angular orientation between surfaces 411' and 421' should be accurately controlled. According to this embodiment, two additional sub-prisms 430 and 440 may be used to achieve accurate angular alignment in both the x-y and y-z planes. Each one of sub-prisms 430 and 440 have two non-parallel surfaces 431 and 432, and 441 and 442, respectively, wherein the angle between surfaces 431 and 432 could be different than that between 441 and 442. Prism 420' is bonded to sub-prism 430 by bonding surfaces 422' and 431, and prism 410' is bonded to sub-prism 440 by bonding surfaces 412' and 441. Sub-prisms 430 and 440 can be rotated around the z-axis before clamping/fixing their orientation, and prisms 410' and 420' can be rotated around the norm to surfaces 412' and 422', respectively. If the initial angle between 412' and 422' in the y-z plane is close to that required, a small rotation of sub-prism 430 as compared to sub-prism 440 would suffice to fully control the required correction in the y-z plane. In this case, rotation of 420' around the norm to 420' would control mostly the angle in the x-y plane, and rotation of sub-prisms 430 or 440 around the norm to 442 or 432, respectively would control mostly the angle in the y-z plane. It is noted that rotation of prism 420 around its normal provides only one degree of freedom, therefore only the angle between surfaces 411' and 421' in the y-x plane can be controlled (in other words, correction of the relative angle between surfaces 411' and 421' can be performed only in one dimension). Advantageously, adding sub-prisms 430 and 440 introduces another degree of freedom, and therefore allows controlling the relative angle between surfaces 411' and 421' in two dimensions, therefore the angle can be controlled also in the y-z plane.

According to some embodiments, each one of complex prism 400', prism 410', prism 420', surface 411', surface 421', surface 412' and surface 422', may be the same as (e.g., have the same characteristics) complex prism 400, prism 410, prism 420, surface 411, surface 421, surface 412 and surface 422, respectively. According to alternative embodiments, some or all of the following elements: complex prism 400', prism 410', prism 420', surface 411', surface 421', surface 412' and surface 422', may be different than complex prism 400, prism 410, prism 420, surface 411, surface 421, surface 412 and surface 422.

Figure 2:
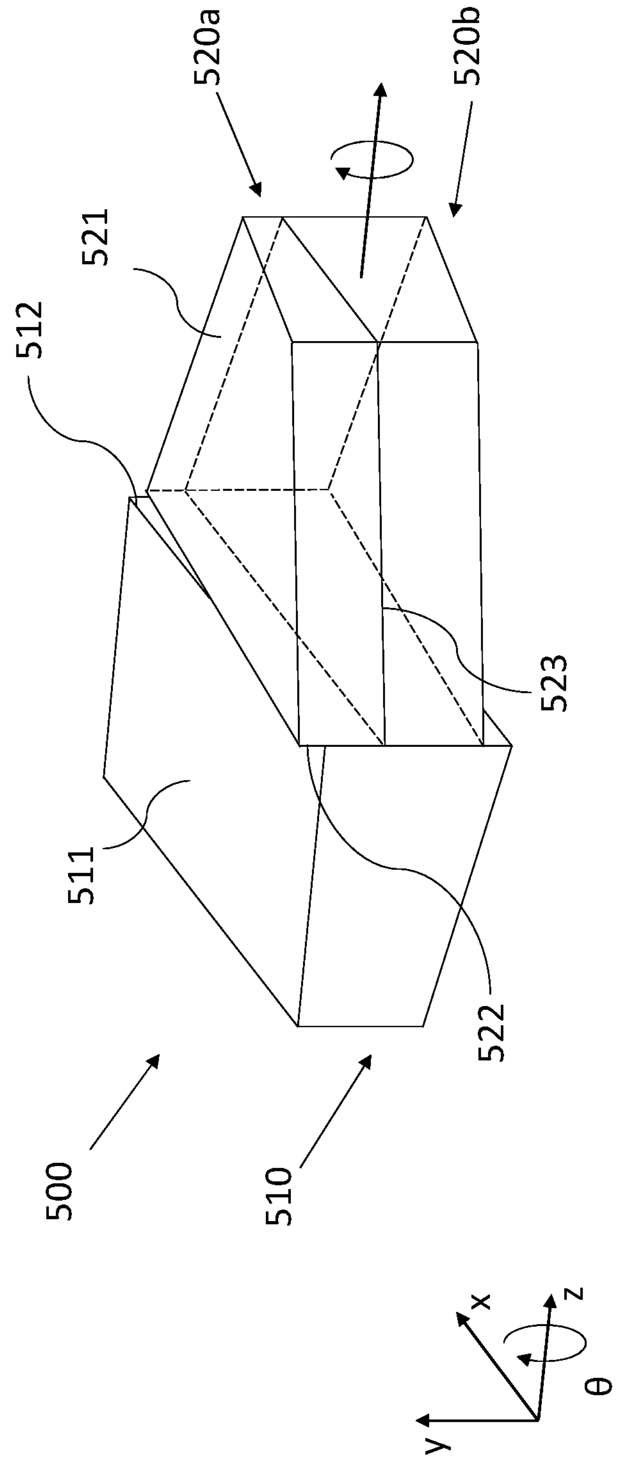
FIG. 2 schematically depicts bonding by active alignment of a complex prism having an internal facet, according to some embodiments.

FIGS. 1A and 1E demonstrate, in accordance with some embodiments, alignment according to external surfaces. However, according to other embodiments, the sub-prisms may be composed of several smaller sub-prisms that are combined together, and/or may include some internal structure, and the desired alignment may be between internal surfaces or between an internal surface and an external surface. This is demonstrated in FIG. 2, which schematically depict bonding by active alignment of a complex prism 500 having an internal facet, according to some embodiments. Complex prism 500 is constructed by bonding two sub-prisms, sub-prism 510 and sub-prism 520 by attaching their two respective surfaces 512 and 522. Sub-prism 520 is composed of two smaller sub-prisms **520*a* and 520*b*** that are bonded together forming an internal surface lying therebetween.

According to this example, it is desired that external surface 511 of sub-prism 510 and internal surface 523 of sub-prism 520 will be oriented at an accurate angle with respect to one another.

In accordance with some embodiments, sub-prisms **520*a* and 520*b* may be made of different materials, and internal surface 523 may be coated with an optical coating. It is noted that since light is refracted when entering a media and since surface 521 is not measured, the absolute angle between surfaces 523 and 511 cannot necessarily be measured accurately according to the method described above for complex prism 400 (FIGS. 1C and 1D). The configuration of FIGS. 1C and 1D could be used, in accordance with some embodiments if, for instance, external surface 521 would be parallel to internal surface 523 at some accuracy, and surface 511 should be aligned according to both surfaces 521 and 523**.

When this is not necessarily the case, in accordance with some embodiments, sub-prism 520 of complex prism 500 (or parts thereof) may be placed in contact with another structure that is made of a media with a refractive index that is matched to that of sub-prism 520 (or at least with sub-prism **520*a*), where the geometry of the structure is made such that light impinging the surface 521 would enter the index-matched media at normal incidence (or close to normal incidence). For example, the entire complex prism or parts thereof, may be placed inside a tank with an index-matching immersive medium (such as a liquid). In this case, light would not be refracted when entering the media at surface 521, and the accurate absolute angle between surfaces 511 and 523** could be measured.

Figure 3B:
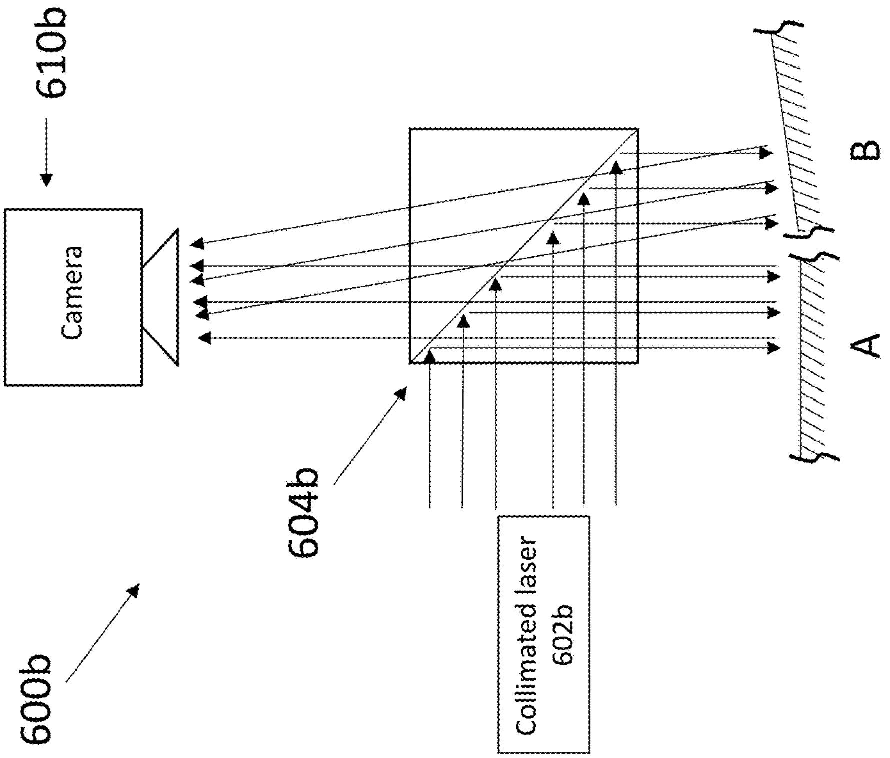
FIGURE 3B (Prior Art)
FIGS. 3A and 3B schematically depict prior art methods for measuring an angle between the surfaces.
Figure 3A:
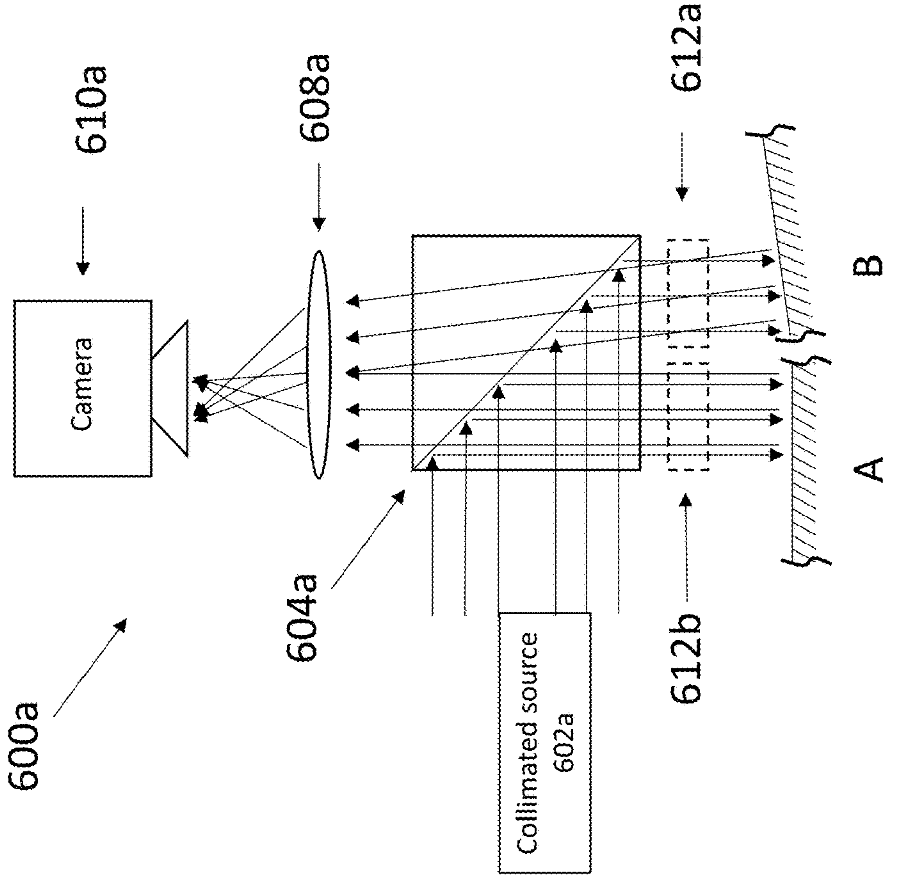
FIGURE 3A (Prior Art)

Two examples of optical setups for measurement of the angle between two desired surfaces (for example, surface 411 and 421, are demonstrated in FIGS. 3A and 3B.

As depicted in FIG. 3A, optical setup **600*a* includes a collimated illumination source 602*a* configured to illuminate (for example, utilizing an optical element 604*a*, such as a beam splitter) the two surfaces A and B (such as but not limited to surface 411 of sub-prism 410 and surface 421 of sub-prism 420 or surface 511 sub-prism 510 and surface 523 of sub-prism 520**), between which the angle should be accurately measured and aligned. It is noted that surfaces A and B are not shown in full and may represent two surfaces of the same prism or different sub-prisms or a surface of a mediating optical element as described below.

The collimated light beam (depicted by arrows) impinges on both surfaces A and B, such that part of the beam is reflected by surface A and another part of the beam is reflected by surface B. The light reflected from surfaces A and B is then focused (e.g., using a lens, such as lens 608*a* to small spots or lines on a detector such as a camera 610*a*, thereby converting any angular misorientation to a spatial separation of the light from each surface. In other words, different angles of surfaces A and B results in shifted spots on camera 601*a*, and the displacement of the two spots indicates their relative angular orientation. According to some embodiments, optical setup 600*a* may further include shutters 612*a* and 612*b*, which are configured to allow controllable blocking of incident light from impinging on surface A or surface B so as to facilitate detecting light from one surface at a time. This may be of particular relevance in embodiments wherein surface A and surface B are nominally parallel—in which case, were shutters 612 not used, the two spots may not be well resolved, and the accuracy of the measurement would be limited.

According to some embodiments, a commercially available autocollimator may also be used.

Alternatively, an optical setup 600*b* (as depicted in FIG. 3B) may be used, utilizing a coherent illumination source such as collimated laser 602*b*. The collimated laser beams illuminate (as in FIG. 3A, for example, utilizing an optical element 604*b*, such as a beam splitter) the two surfaces A and B (such as, but not limited to, surface 411 of sub-prism 410 and surface 421 of sub-prism 420), between which the angle should be accurately measured and aligned. The collimated laser beam impinges on both surfaces A and B, such that part of the beam is reflected by surface A and another part of the beam is reflected by surface B. The reflected collimated light from both surfaces A and B can be superimposed so as to generate an interference pattern of bright and dark spots on a detector, such as camera 610*b*. The fringe spacing of the resulting interference pattern is indicative of the relative angular orientation of the two surfaces A and B. Such methods can result in high resolution, as low as about 1 arcsec, for angles up to a few degrees.

However, when measuring/validating parallelism between surfaces, it is often difficult to accurately measure small angles, e.g., on the order of few arcseconds using schemes such as described in FIGS. 3A and 3B.

In cases where the surfaces to be aligned (or which alignment need be verified) laterally overlap one another (e.g., when one of the surfaces is an external surface and the second surface is an internal surface, normally parallel thereto and located therebelow), it is not possible to block one or the other of the surfaces utilizing a shutter (as in FIG. 3A). In such cases, if the relative angle between the two surfaces is small, the spots may not be resolved, especially if the reflectivity from one surface is stronger than the reflectivity of the second surface. Similarly, in the method of FIG. 3B, the relative angle can be accurately measured if there is a clear interference pattern, namely if the angle between the measured surfaces A and B is not too small when the two surface laterally overlap.

Figure 4B:
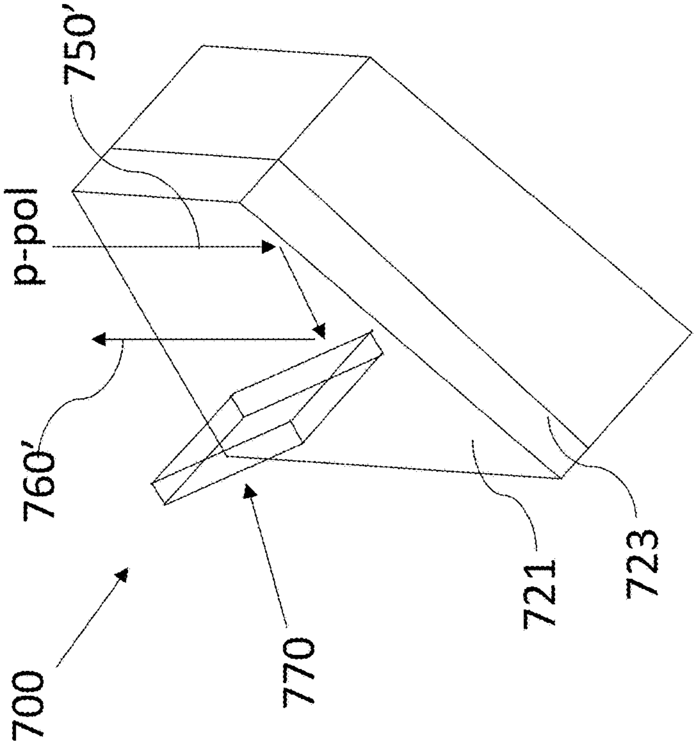
FIGS. 4A and 4B schematically depict methods for measuring parallelism between surfaces by exploiting Brewster's angle, according to some embodiments.
Figure 4A:
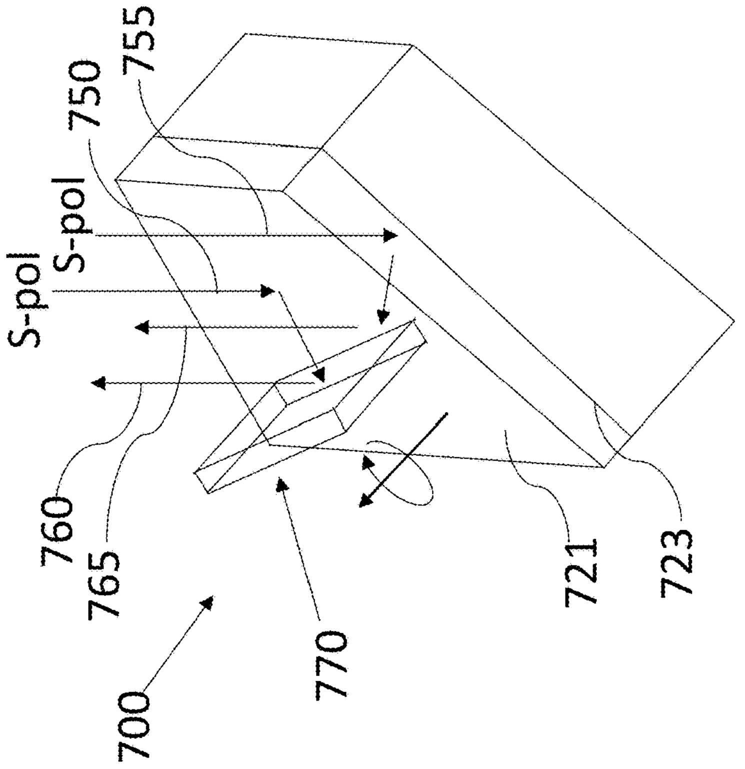

According to some embodiments, wherein two surfaces are nominally parallel and laterally overlap, to overcome the challenges discussed in the previous paragraph, illumination of the samples with polarized light at Brewster's angle (as depicted in FIGS. 4A and 4B) may be applied. Since the Brewster angle for an external surface is different than that of an internal structure, the two signals can be distinguished by illuminating them in polarized light. The reflected signal can be detected by a detector collecting light at the appropriate angle, or by utilizing an optical element such as a mirror that reflects light back to the source (for instance, when using an autocollimator). If one of the surfaces has a significantly higher reflection, the sample should be placed at the angular orientation of the Brewster angle of that surface. Then, for s-polarized light, both surfaces reflect, but one surface dominates the detected signal; while for p-polarized light only the low-reflectivity surface reflects light.

FIGS. 4A and 4B schematically depict methods for measuring/validating parallelism between two surfaces of composite prism 700, external surface 721 and internal facet 723 by exploiting Brewster's angle, according to some embodiments. Assuming one of the surfaces has significantly higher reflection than the other surface (in this case internal facet 723 has higher reflection than surface 721, but the method can be applied also if the reflectivity of surface 721 was higher than that of facet 723), the sample is placed at the angular orientation of the Brewster angle of that surface (in this case facet 723). Then, s-polarized light (indicated by 750 and 755) is directed towards surfaces 721 and 723 respectively (FIG. 4A). For s-polarized light from both surfaces 721 and 723 is reflected (indicated by 760 and 765) but one surface (723) dominates the detected signal. However, when p-polarized light 750' is directed towards surfaces 721 and 723 (FIG. 4B) only the low-reflectivity surface (721) reflects light (760'). The reflected light can be detected by a detector collecting light at the appropriate angle, or by utilizing an optical element such as a mirror 770. If mirror 770 is perpendicular to surface 721, it will act as a one-dimensional retro reflector, and reflect light back to the source (for instance, when using and autocollimator, not shown).

Figure 4C:
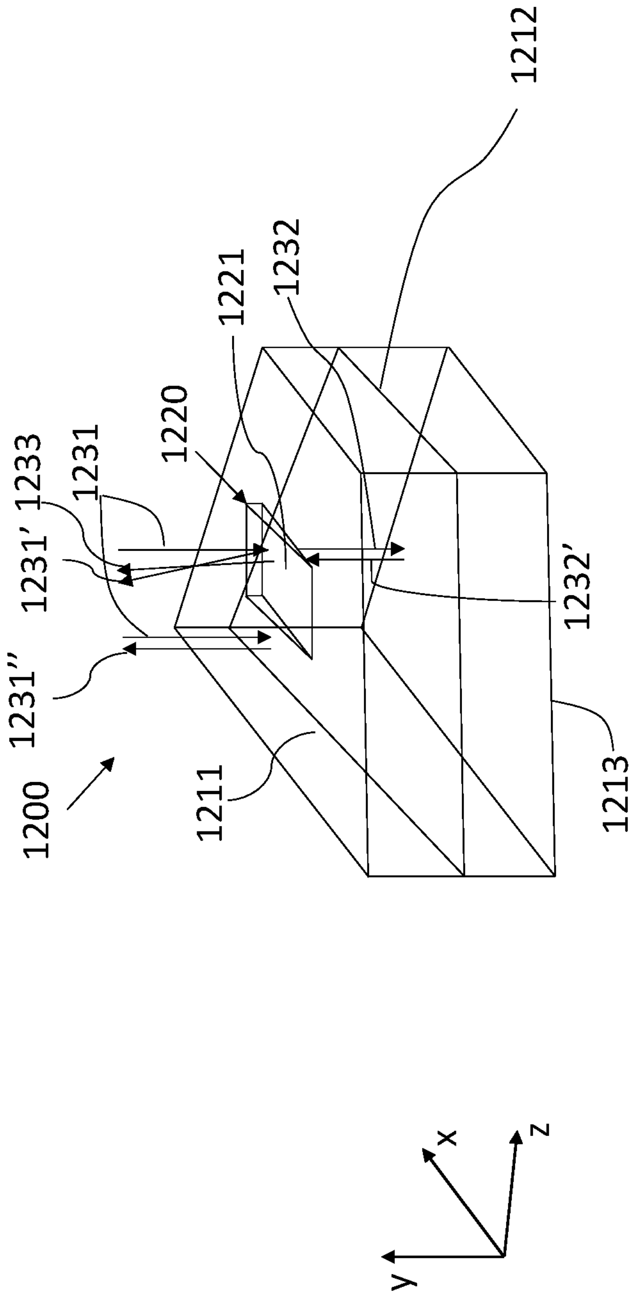
FIG. 4C schematically depicts a method for measuring the relative angle between two nearly parallel surfaces, according to some embodiments.

In another embodiment, the relative angle between two nearly parallel surfaces can be measured, as described in FIG. 4C. As discussed above, it is difficult to measure/validate the relative angle between two surfaces that are nearly parallel. For instance, when using an autocollimator setup where the angle of each surface is determined by illuminating the surface with a collimated light beam, each of the light beams reflected from each of the surfaces is focused to a small spot on the plane of the detector (e.g., camera). In this manner, angular displacements of the surfaces translate to lateral displacements of the signal. Optically, each spot has a certain width, and the resolution of the measurement can be improved by considering the central part of the spot.

However, when measuring reflection from two nearly parallel surfaces, the spots from both surfaces will partially overlap, and the accuracy of the measurement will be reduced. Therefore, it is required to separate the signals obtained from each of the two surfaces. This may be addressed, in accordance with some embodiments, by placing a wedge prism on a top surface of the optical element and blocking light that does not go through the wedge prism, such that only a bottom (or internal) surface of the optical element and the top surface of the wedge prism will reflect light, and no light will be reflected from the top surface of the optical element (if an index matched liquid is placed between the wedge prism and the optical element). Since the top surface of the wedge prism and the bottom surface of the optical element are not parallel, their reflected light signals will be distinguishable, thereby the reflection angle of the bottom surface of the optical element can be calculated accurately. Next, the measurement of the top surface of the optical element can be obtained by blocking light from the wedge prism and considering only light reflected from the top surface of the optical element.

As described in FIG. 4C, a prism 1200 with external surfaces 1211 and 1213, and an internal partially reflective surface 1212 is considered, where it is desired to measure the relative angle between the internal surface 1212 and the external surfaces 1211. This is achieved by placing a thin prism 1220 with a wedge (the angle of the wedge could be as small as about an arc minute) on top of surface 1211 with an index-matched liquid. In this manner a collimated light beam/laser beam represented by rays 1231 can be directed to impinge prism 1200. Part of beam 1231 impinges on surfaces 1211 and is reflected to rays 1231', and part of beam 1231 impinges on surface 1221 of prism 1220 and is reflected as rays 1231". The relative angle between rays 1231' and rays 1231" indicates the relative angle between surfaces 1221 and 1211. Part of rays 1231 are transmitted through surface 1221 to rays 1232, are then reflected by internal surface 1212 to rays 1232', and are then transmitted through surface 1221 to rays 1233. Finally, the relative angle between surfaces 1212 and 1211 can be calculated from the measurement of the relative angle between rays 1233 and 1231', together with the measurement of the angle of the wedge 1220, as mentioned above.

It is noted that, in accordance with some embodiments, rays 1231' and 1231" can be differentiated in the detection by physically blocking part of the beam. Therefore, the measurement of the relative angles between 1231' and 1233, and between 1231' and 1231" can be performed separately, if the reflectivity from 1212 is weak as compared to the reflectivity from 1221. If needed (i.e., if 1211 and 1213 are nearly parallel), reflections from surface 1213 can be suppressed by placing an index matched liquid on 1213 that would diffuse the reflected light, or alternatively, reflect it to other non-relevant directions.

In accordance with some embodiments, for example, but not limited to, in cases where the angle between the two surfaces of interest is relatively large, i.e., about 90°, it may be preferable to measure the angle using a mediating optical element. Example of such cases is demonstrated in FIGS. 5A-5D.

Figure 5A:
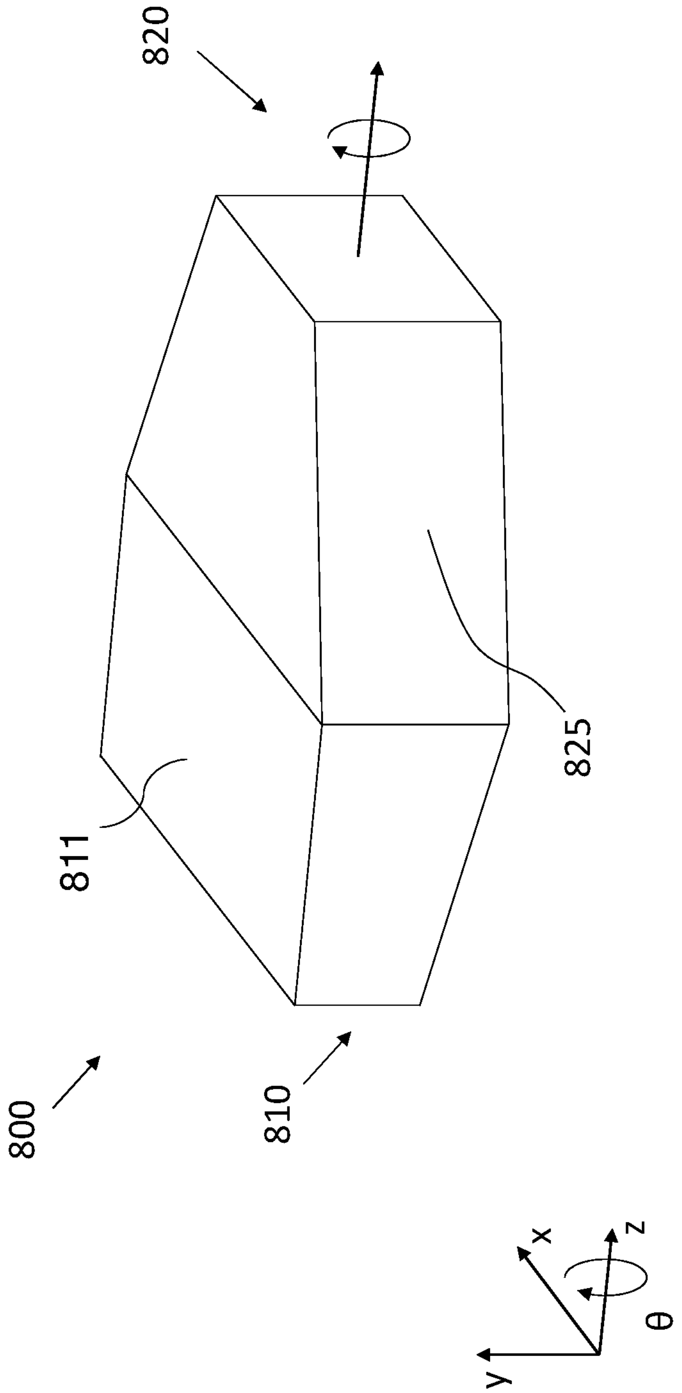
FIG. 5A schematically depicts an exemplary complex prism, for which a required angle between two surfaces of interest is near perpendicular (about) 90°, according to some embodiments.
Figure 5B:
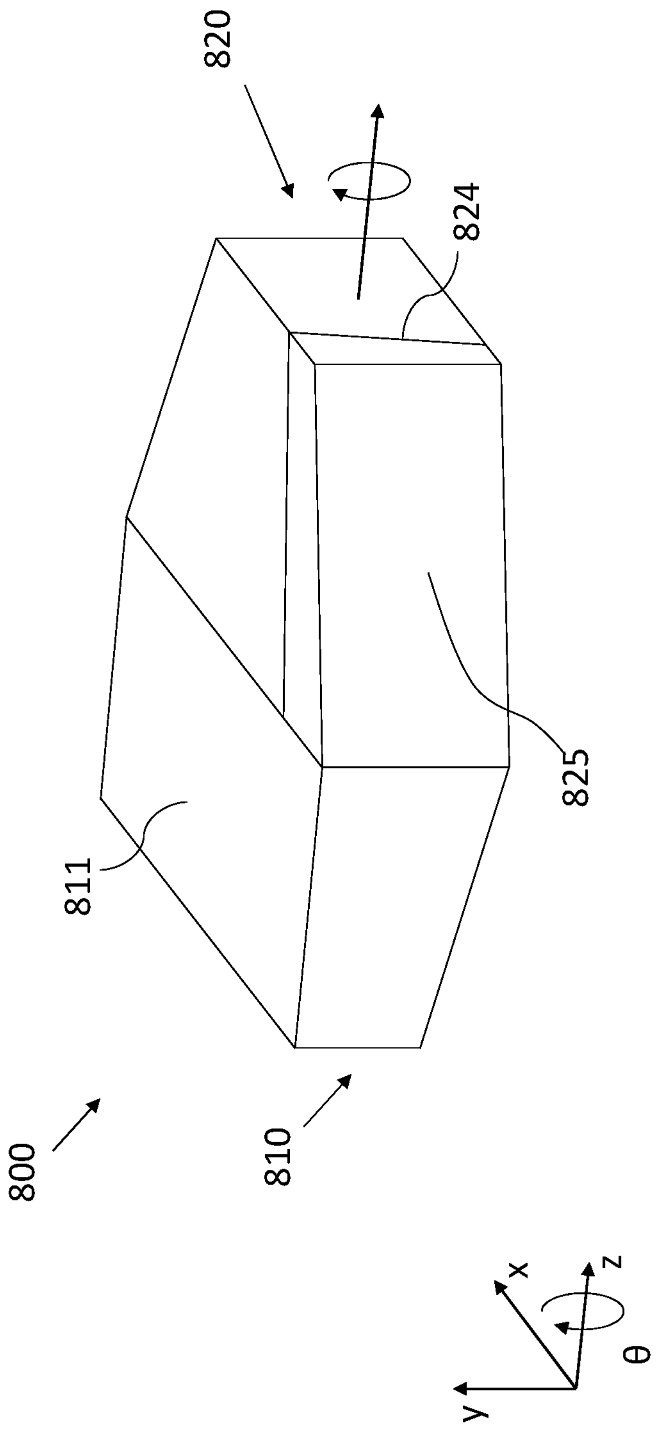
FIG. 5B schematically depicts an exemplary complex prism, for which a required angle between two surfaces of interest, one of which is an internal facet, is near perpendicular (about) 90°, according to some embodiments.

FIG. 5A schematically depicts an exemplary complex prism 800, for which a required angle between two surfaces of interest is near perpendicular (about) 90°, according to some embodiments. In this case, two external surfaces, surface 811 of sub-prism 810 and surface 825 of sub-prism 820 should be positioned with a relative angle between them that is close to 90°. Similarly, FIG. 5B schematically depicts exemplary complex prism 800, for which a required angle between two surfaces of interest, one of which is an internal facet, is near perpendicular (about 90°), according to some embodiments. In this case, external surface 811 of sub-prism 810 and internal surface 824 of sub-prism 820 should be positioned with a relative angle between them that is close to 90°. The reflected light from the two surfaces could be measured using optical systems, such as those presented in FIGS. 3A and 3B.

Figure 5C:
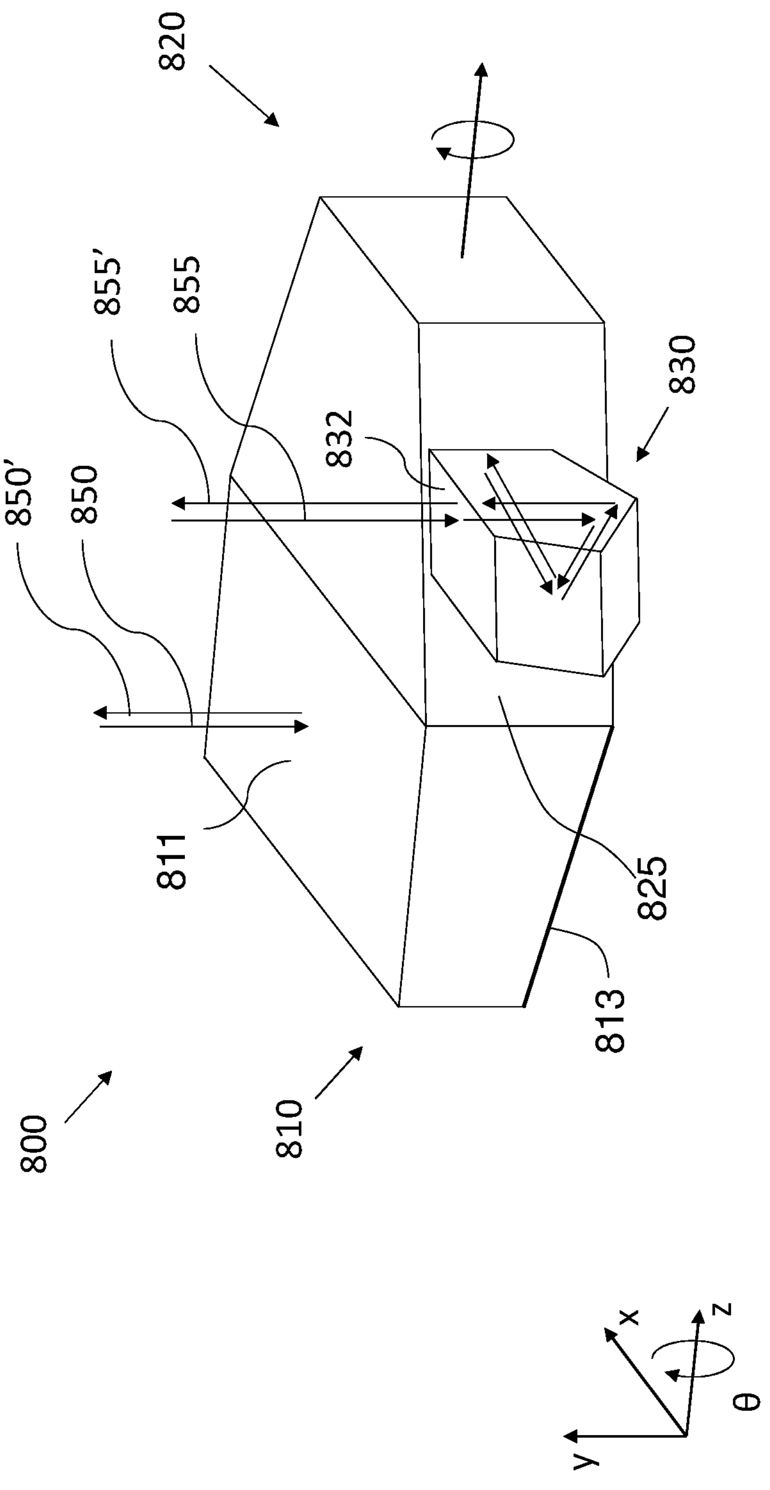
FIG. 5C schematically depicts a method for bonding by active alignment of near perpendicular surfaces of the complex prism of FIG. 5A and FIG. 5B utilizing a mediating optical element, according to some embodiments.

Reference is now made to FIG. 5C, which schematically depicts, in accordance with some embodiments, a method/setup for bonding by active alignment sub-prisms 810 and 820 of complex prism 800 according to near perpendicular external surfaces, surface 811 of sub-prism 810 and surface 825 of sub-prism 820, which should be positioned with a relative angle between them that is close to 90°. Such alignment and bonding are achieved utilizing a mediating optical element, such as mediating optical element (light folding element) 830, placed in front of surface 825. According to some embodiments, the mediating optical element may be a pentaprism, as demonstrated in FIG. 5C, or any other element that folds light accurately, including but not limited to, a right-angled prism, a set of mirrors, a diffracting optical grating or element, etc. The mediating optical element should be produced with high accuracy, or at least its geometric error should be carefully and accurately measured and subtracted from each measurement. Similarly, in accordance with some embodiments mediating optical elements could also be used in cases where the relative angle between two surfaces of interest is small yet non-zero.

According to some embodiment, the angle at which mediating optical element 830 folds the light is equal to the nominal angle between surface 825 (to which mediating optical element 830 is attached) and surface 811, as indicated below in greater detail in the discussion regarding FIG. 6.

A first part of collimated light beam/laser (depicted by arrows 850) impinges normally on a sample (complex prism 800) at surface 811 and is reflected back to be detected by the detector (light beams are depicted by arrows 850'). A second part of the collimated light beam/laser (depicted by arrows 855) impinges normally on surface 832 of mediating optical element 830, which is placed such that surface 832 is parallel to surface 811. Second part of collimated light beam/laser 855 is transmitted through surface 832, undergoes internal reflection within mediating optical element 830, exits mediating optical element 830 so as to nominally normally impinge on surface 825 and propagates back through optical element 830 to be detected by the detector (light beams are depicted by arrows 855'). Relative angle between surface 811 and surface 825 may be measured by light according to the above presented methods (for example as described in FIGS. 3A and 3B).

According to some embodiments, in case a sample has two parallel reflective surfaces, for example, when surfaces 811 and surface 813 of sub-prism 810 are parallel and surface 825 is nominally perpendicular thereto, the measurement accuracy may be increased by performing an additional measurement with the sample flipped such that surface 811 replaces surface 813 and surface 832 stays in its place (parallel to surface 813). Finally, the relative angle of the mediating optical element may be calculated as the average of the absolute value of these two measurements.

Occasionally, one (or more) of the surfaces of the mediating optical element may reflect light into the measuring system and contaminate the recorded image with a deleterious reflection. To overcome this effect, in accordance with some embodiments, the deleterious reflection may be suppressed by applying light absorbing material on the undesirably reflective surface (e.g., painting the surface with light absorbing paint), grinding the surface or covering it with a refractive index matched material that scatters light, e.g., grease or wax. According to additional or alternative embodiments, the deleterious reflection may be distinguished from the desired reflection by coating the surfaces with spectrally sensitive optical coatings. In this manner, the two surfaces will reflect different optical spectra.

Figure 5D:
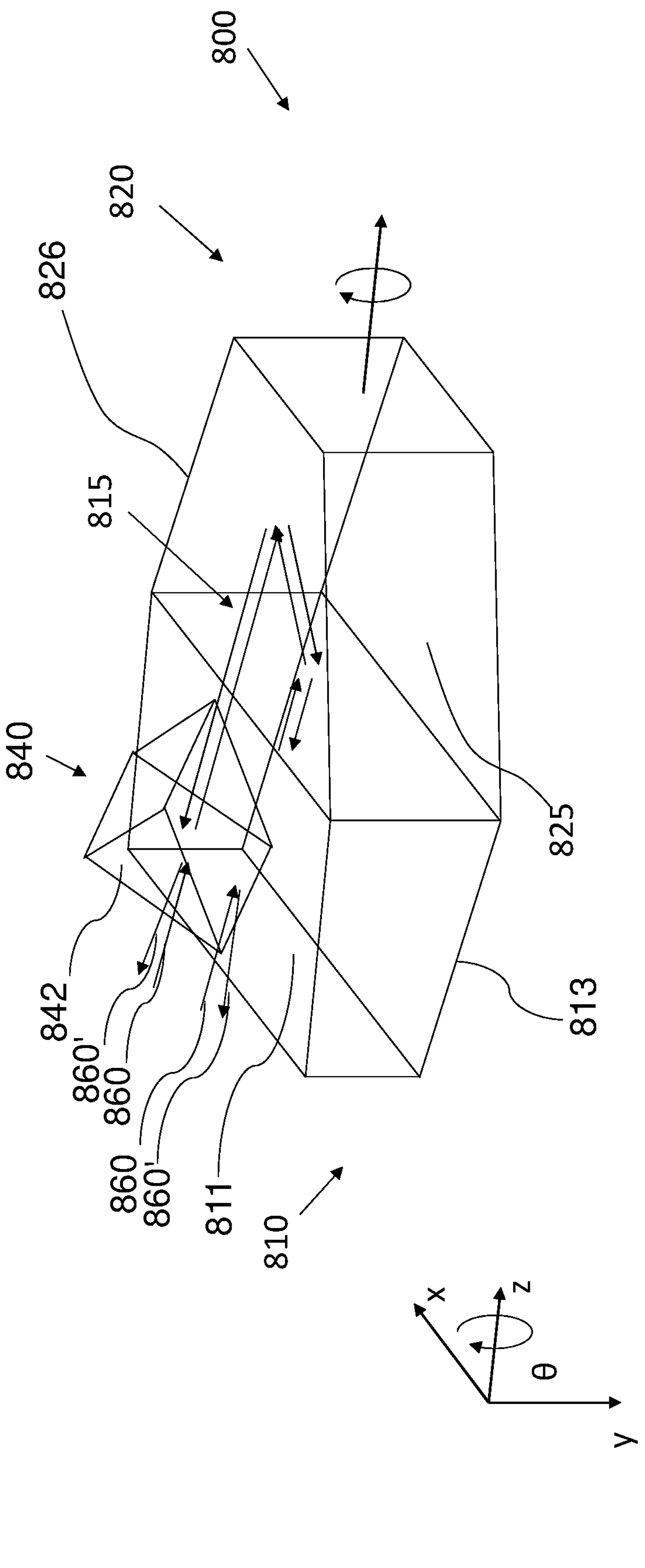
FIG. 5D schematically depicts a method for bonding by active alignment of near perpendicular surfaces of the complex prism of FIG. 5A and FIG. 5B utilizing a mediating optical element, according to some embodiments.

Reference is now made to FIG. 5D, which schematically depicts a method for bonding by active alignment or for measurement of near perpendicular surfaces (external surface 813 of sub-prism 810 and external surface 826 of sub-prism 820) of a complex prism, such as complex prism 800 utilizing a mediating optical element 840, according to some additional or alternative embodiments. This method is based on the fact that two perpendicular surfaces effectively form a retro-reflection effect. For the purpose of explanation and without limiting to any theory, if the first surface 813 has norm $\vec{n}_1$ and the second surface 826 has a norm $\vec{n}_2$, and if $\vec{n}_1 \perp \vec{n}_2$, then light propagating in the direction $\vec{n}_1+\vec{n}_2$ will be reflected back in the same angular orientation (but opposite sign). To overcome dispersion at the entrance and to avoid total internal reflection (TIR) of the incoming light (i.e., in cases where $\vec{n}_1+\vec{n}_2$ is beyond the critical angle), mediating optical element 840, which in this case is a coupling-in prism. More specifically, collimated light beam/laser (depicted by arrows 860) impinges on surface 842 of mediating optical element 840, and is reflected back (as depicted by arrows) from external surfaces 826 and 813 through surface 842 of mediating optical element 840 to ray 860'.

Notice there are two possible optical paths: one where the incoming light 860 is first reflected by surface 813 and then by surface 826 (depicted by grey arrows 815), and another one where the incoming light 860 is first reflected by surface 825 and only then by surface 813 (depicted by grey arrows 815). If the surfaces 813 and 826 are not fully perpendicular, rays 860 and 860' will not be parallel, and the rays 860' originating from the first optical path would be different than those originating from the second optical path. Each path will be tilted in opposite directions, and the angular distance between these two light peaks will indicate the relative orientation of the surfaces.

Figure 5E:
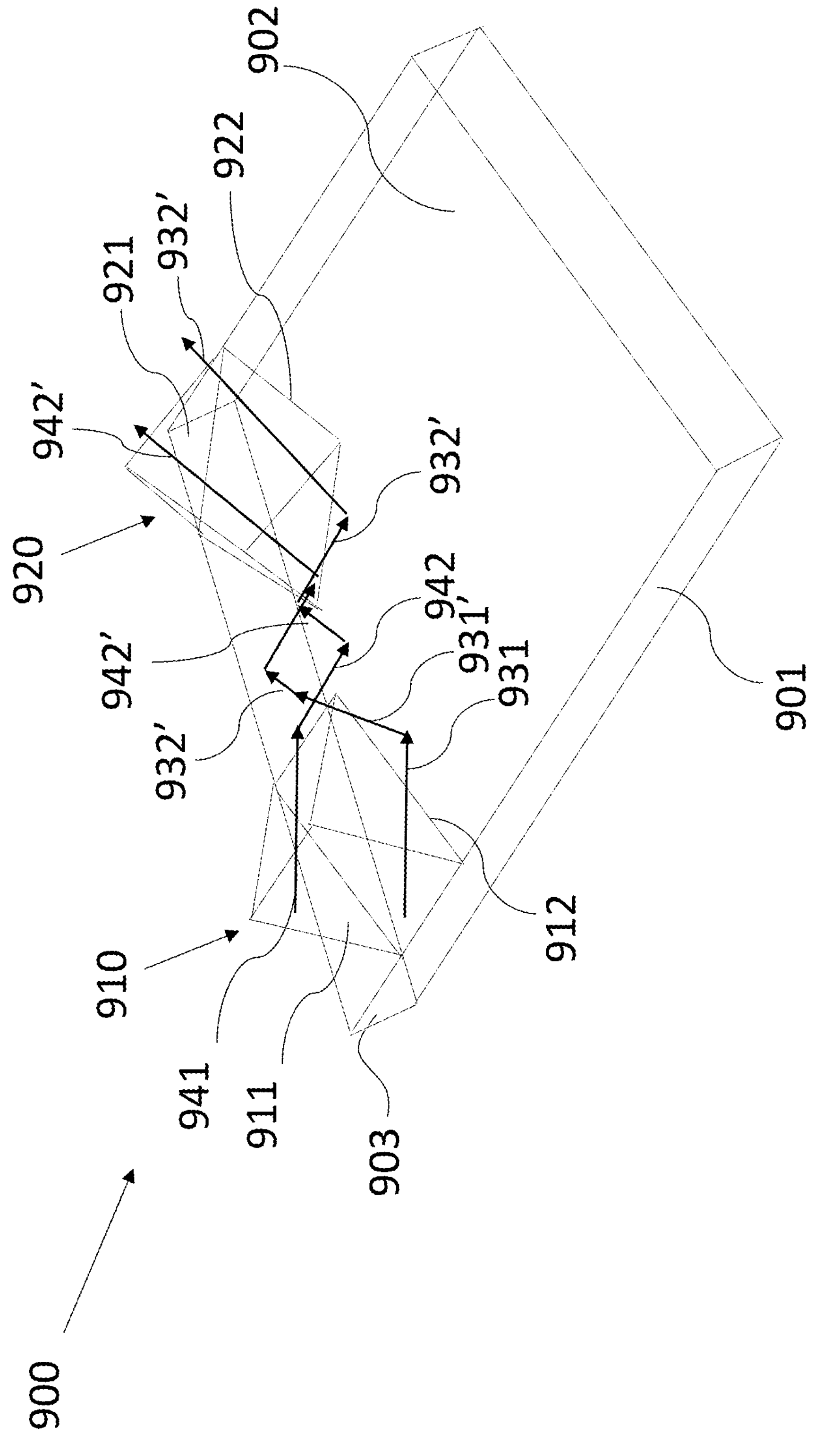
FIG. 5E schematically depicts a method for measuring perpendicularity by ascending and descending rays, according to some embodiments.

Similarly, the configuration of also FIG. 5E may be used for measuring perpendicularity of two surfaces 903 and 901 of complex prism 900, in accordance with some embodiments. In this case ascending and descending rays may be used to observe splitting between light impinging one surface first or the other. Collimated parallel light rays 931 and 941 impinge on surface 911 of prism 910 (if surfaces 901 and 902 are parallel to one another, the light rays would be trapped in the slab waveguide composed of these surfaces). Light ray 931 would be reflected by surface 901 (either by Fresnel reflection, or, more preferably, by total internal reflection) to ray 931'. Ray 931' is then reflected by surface 903 to ray 932', which is then transmitted by surface 921 of prism 920. Surfaces 912 and 922 of prisms 910 and 920, respectively, may be placed above surface 902, or may be bonded with an index matched adhesive (this is required in cases where light is in total internal reflection to surface 902). Similarly, light ray 941 is reflected by 902 to ray 942, which is then reflected by surface 901 to ray 942'. Ray 942' is transmitted by surface 921 of prism 920. It is noted that ray 931 is first reflected by surface 901 and then by surface 903, while ray 941 is first reflected by surface 903 and then by surface 901. Therefore, if two surfaces 903 and 901 are not fully perpendicular to one another, rays 932' and 942' will not be parallel to one another, and the angular spacing between them (measured by optical systems such as those in FIGS. 3A and 3B) indicates the relative angle between surfaces 901 and 903.

The figures disclosed hereinabove, in accordance with some embodiments, are typically (not necessarily) related to cases where the required angle between two surfaces (to be measured/validated or aligned) is either small, e.g., smaller than about 10 deg, or large, e.g., larger than about 80 deg. In accordance with some embodiments, in cases where the required angle between the two surfaces is intermediate (e.g., between about 10 deg and about 80 deg) the relative angle may be calculated by a custom made mediating optical element, as presented, for example, in FIG. 6.

Figure 6:
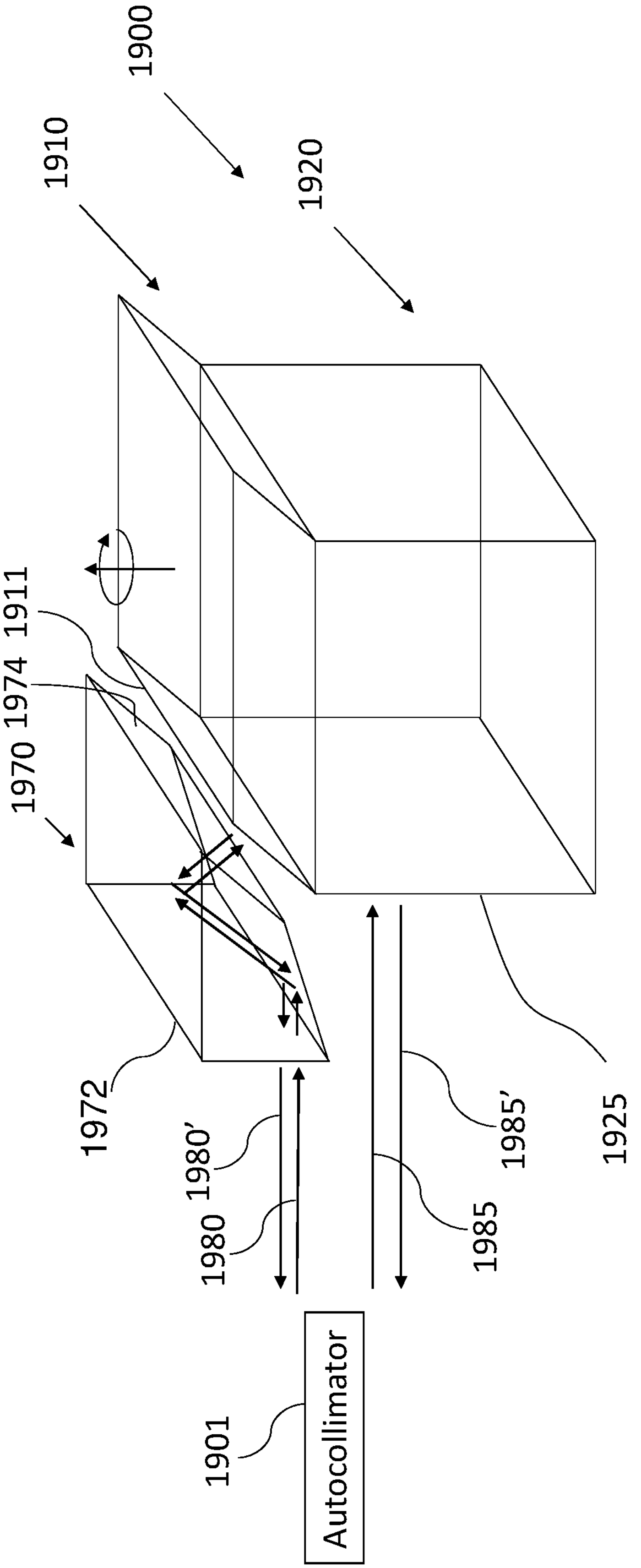
FIG. 6 schematically depicts a method for bonding by active alignment of a complex prism (for two surfaces of interest having any angle between them) utilizing a mediating optical element, according to some embodiments.

FIG. 6 schematically depicts, according to some embodiments, a method for bonding by active alignment or for measurement/validation of an orientation of two surfaces of interest having any oblique angle between them, in a complex prism, utilizing a mediating optical element. As demonstrated, surfaces 1911 of sub-prism 1910 and surface 1925 of sub-prism 1920 of complex prism 1900 should be aligned based on a predetermined desired angle therebetween and/or the nominal angle between these two surfaces should be measured/validated in view of a predetermined desired angle.

Light from an autocollimator 1901 is directed to impinge, normally, on surface 1972 of optical element 1970, positioned parallel to surface 1911 of sub-prism 1910, such that the transmitted rays through surface 1974 impinge surface 1911 (light beams are depicted by arrows 1980), and on surface 1925 of sub-prism 1920 (light beams are depicted by arrows 1985). Light that is reflected back from surface 925 of sub-prism 1920 (light beams are depicted by arrows 1985') is detected by the detector. Light that is transmitted into optical element 1970, exits therefrom so to nominally normally impinge on surface 1911 of sub-prism 1910 and propagates back through optical element 1970 to be detected by the detector (light beams are depicted by arrows 1980'). The distance between the two light peaks obtained on the detector will thus indicate the relative orientation between surfaces 1911 and 1925.

It is noted that optical element 1970 is shown herein as a prism but may be any other optical element that is configured to fold light at a desired predetermined angle.

According to some additional or alternative embodiments, it is often required to control and/or to validate the relative positioning of a sub prism relative to other (one or more) sub-prism(s) in a complex prism structure. This can be required in addition to or instead of controlling, adjusting and/or validating the angular orientation between two or more prisms that are then bonded together (or surfaces thereof. Examples of such cases are described in FIGS. 7A-7C, according to some embodiments.

Figure 7A:
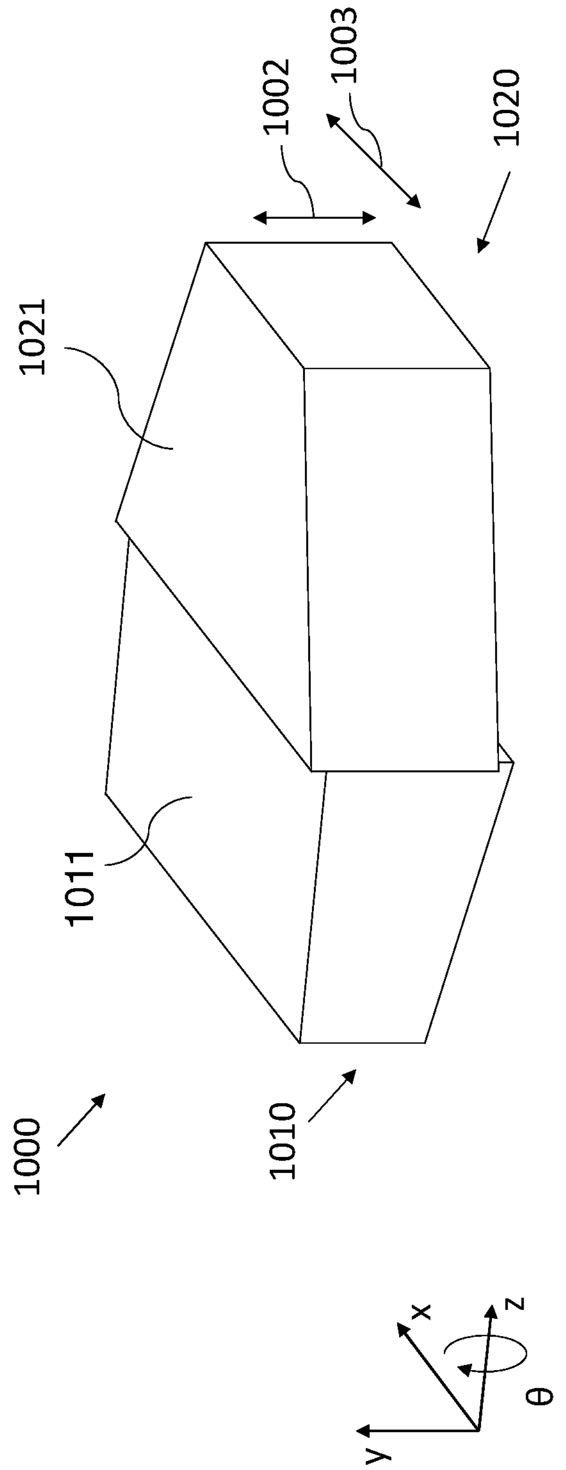
FIG. 7A schematically depicts an exemplary complex prism, for which a relative position between two sub-prisms is set according to an external surface of the prism, according to some embodiments.

According to some embodiments, there is provided a method and a system for controlling the relative position between two or more sub-prisms according to external surface(s) of a complex prism, as shown in FIG. 7A, which schematically depicts an exemplary complex prism 1000, for which a relative position between sub-prisms 1010 and 1020 should be set and/or validated according to their respective external surfaces 1011 and 1021. Adjusting the relative position between sub-prisms 1010 and 1020 may be performed by moving one of the sub-prisms in respect to the other along y axis (as depicted by arrow 1002), x axis (as depicted by arrow 1003) or both. According to some embodiments, for y axis location, the camera should be positioned such that it points towards the x axis. For x-axis location, the camera should be positioned such that the camera points towards the −y axis. For example, if surfaces 1011 and 1021 of respective sub-prisms 1010 and 1020 are meant to align such that the left edge of surface 1021 and the right edge of surface 1011 are coincident with one another, this is not the case shown in FIG. 7A, and adjustment is required.

Figure 7B:
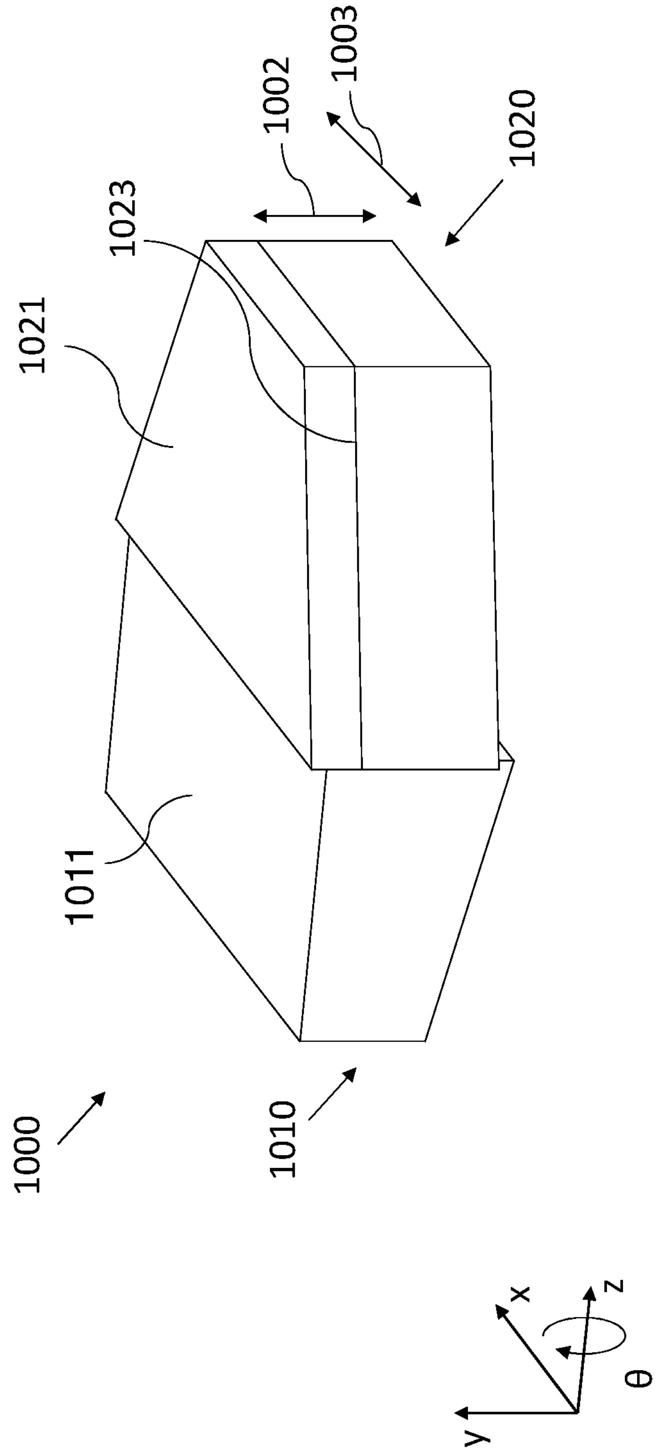
FIG. 7B schematically depicts an exemplary complex prism, for which a relative position between two sub-prisms is set according to an internal facet of the prism, according to some embodiments.
Figure 7C:
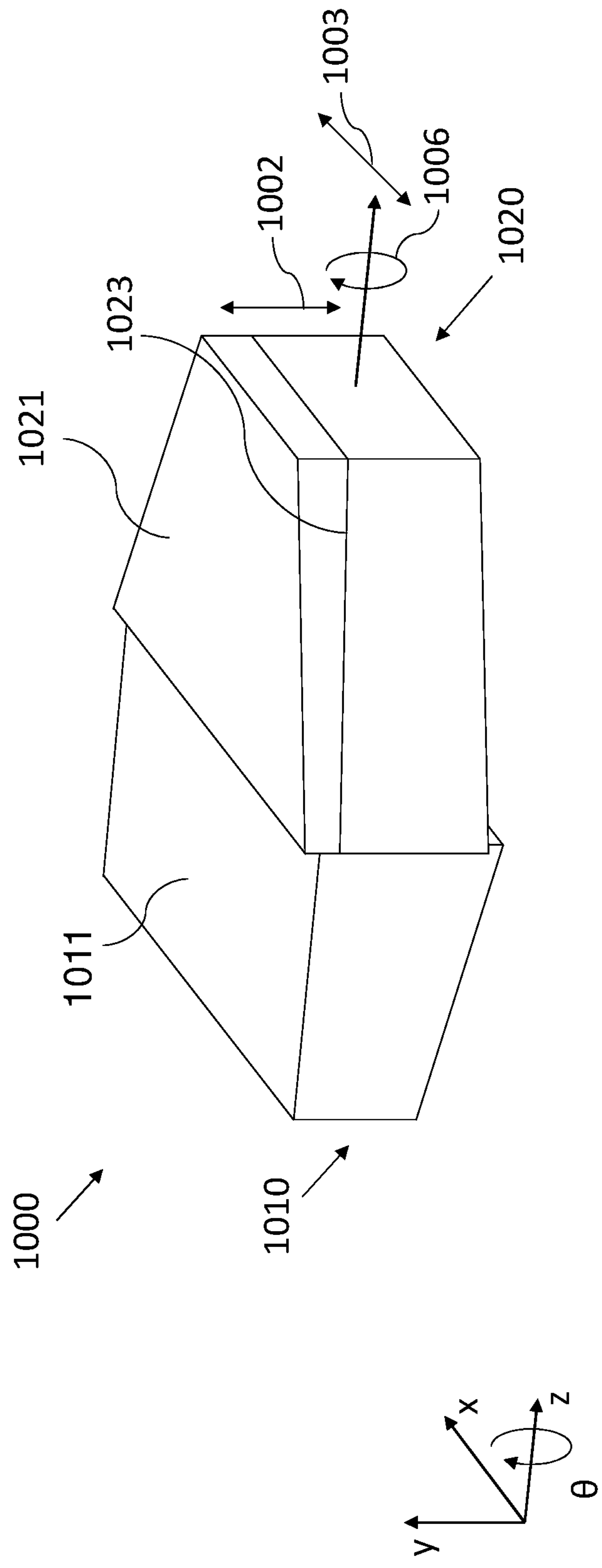
FIG. 7C schematically depicts an exemplary complex prism, for which orientation and a relative position between two sub-prisms is set according to an internal facet of the prism, according to some embodiments.

According to some embodiments, there is provided a method and a system for controlling the relative position between two or more sub-prisms according to external surface(s) and internal facet(s) of the complex prism, as shown for example in FIG. 7B, which schematically depicts an exemplary complex prism 1000, for which a relative position between sub-prisms 1010 and 1020 should be set and/or validated according to external surface 1011 (of sub-prism 1010) and internal facet 1021 (sub-prism 1020).

Adjusting the relative position between sub-prisms 1010 and 1020 may be performed by moving one of the sub-prisms in respect to the other along y axis (as depicted by arrow 1002), x axis (as depicted by arrow 1003) or both. According to some embodiments, for y axis location, the camera should be positioned such that it points towards the x axis. For x-axis location, the camera should be positioned such that the camera points towards the −y axis.

According to some embodiments, there is provided a method and a system for controlling both the relative position and orientation of two or more sub-prisms (typically, but not limited to, simultaneously). The relative position between two or more sub-prisms may be set according to external surface(s) of the complex prism, as shown, for example, in FIG. 7C, which schematically depicts an exemplary complex prism 1000, for which a relative position between sub-prisms 1010 and 1020 should be set and/or validated according to external surface 1011 (of sub-prism 1010) and internal facet 1023 (and/or external surfaces 1021 of sub-prism 1020). Adjusting the relative position between sub-prism 1010 and 1020 may be performed by moving one of the sub-prisms in respect to the other along y axis (as depicted by arrow 1002), x axis (as depicted by arrow 1003) or both. According to some embodiments, for x axis location, the camera should be placed from above, pointing along the y-axis (in other words, the normal to the surface of the camera would be parallel to the y-axis). Adjusting the relative orientation between sub-prisms 1010 and 1020 may be performed by rotating one of the sub-prisms in respect to the other around z axis (as depicted by arrow 1006).

According to some embodiments, as in the case of controlling the angular orientation of the sub-prisms, controlling the relative position between the prisms may be made with an iterative procedure of measurement and correction of the relative position; or according to alternative embodiments, by measuring the relative position in real time while correcting the relative position.

Figure 8:
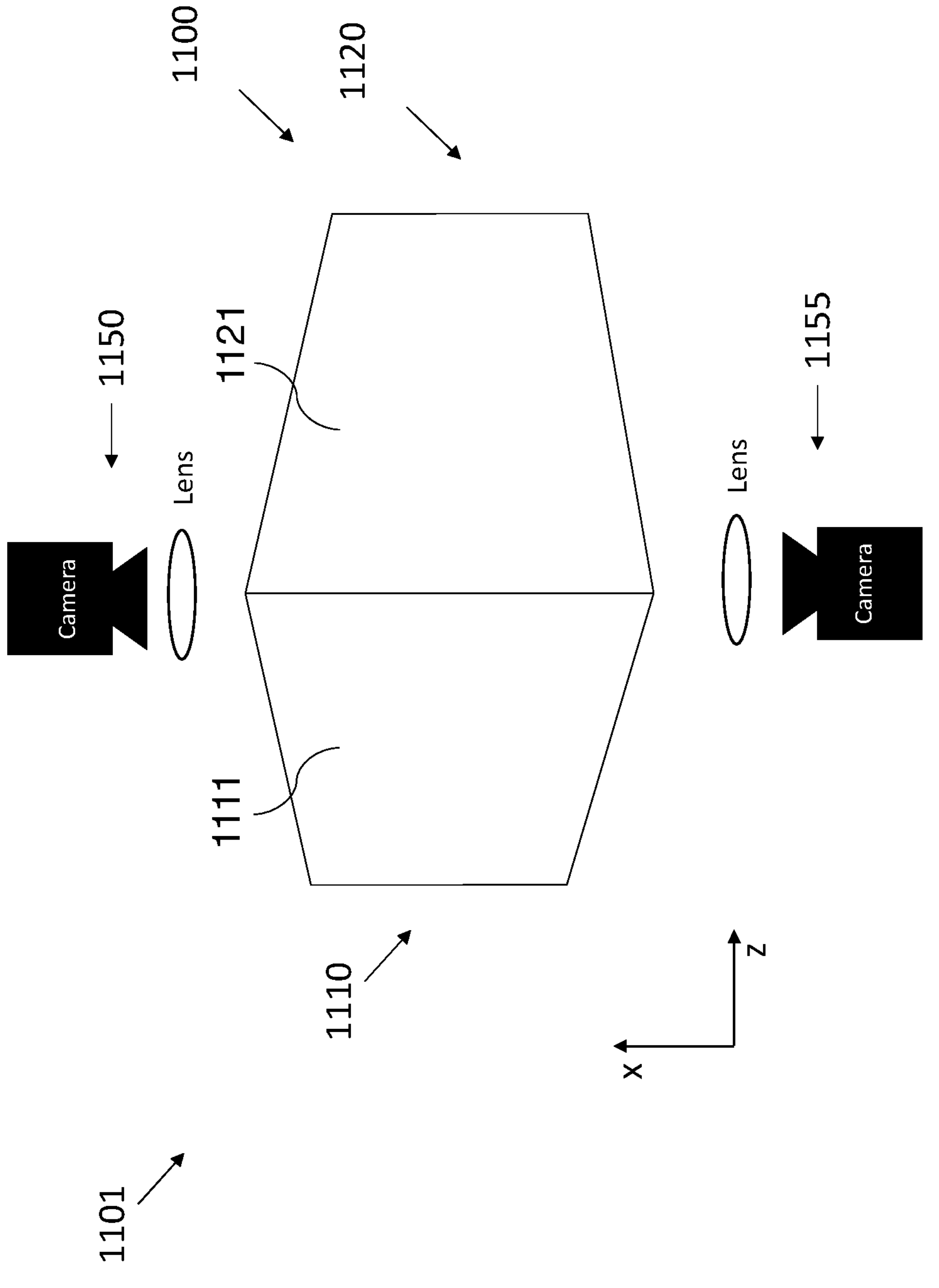
FIG. 8 schematically depicts a top view of a setup for measurement and correction of a relative position between two sub-prisms, utilizing optical imaging, according to some embodiments.

According to some embodiments, the position measurement may be carried out optically, for example by using two cameras with optical imaging systems, such that the positioning can be followed along opposite sides of the prisms such that each camera has visibility to allow determining displacements along both x and y axes. It is noted that in some cases a single camera may also be used for this purpose. Reference is now made to FIG. 8, which schematically depicts a top view of a setup 1101 for validation and/or measurement and correction of a relative position between two sub-prisms (1110 and 1120), utilizing two cameras (1150 and 1155, optionally with lens assemblies) on both sides of complex prism 1100 so as to capture the connection between the two surfaces bonding two sub-prisms (1110 and 1120), according to some embodiments.

According to alternative embodiments, one camera may be used, together with an accurate measurement of the relative angular orientation between sub-prisms 1110 and 1120 (for example, between surface 1111 of sub-prism 1110 and surface 1121 of sub-prism 1120, as discussed hereinabove.

Figure 9:
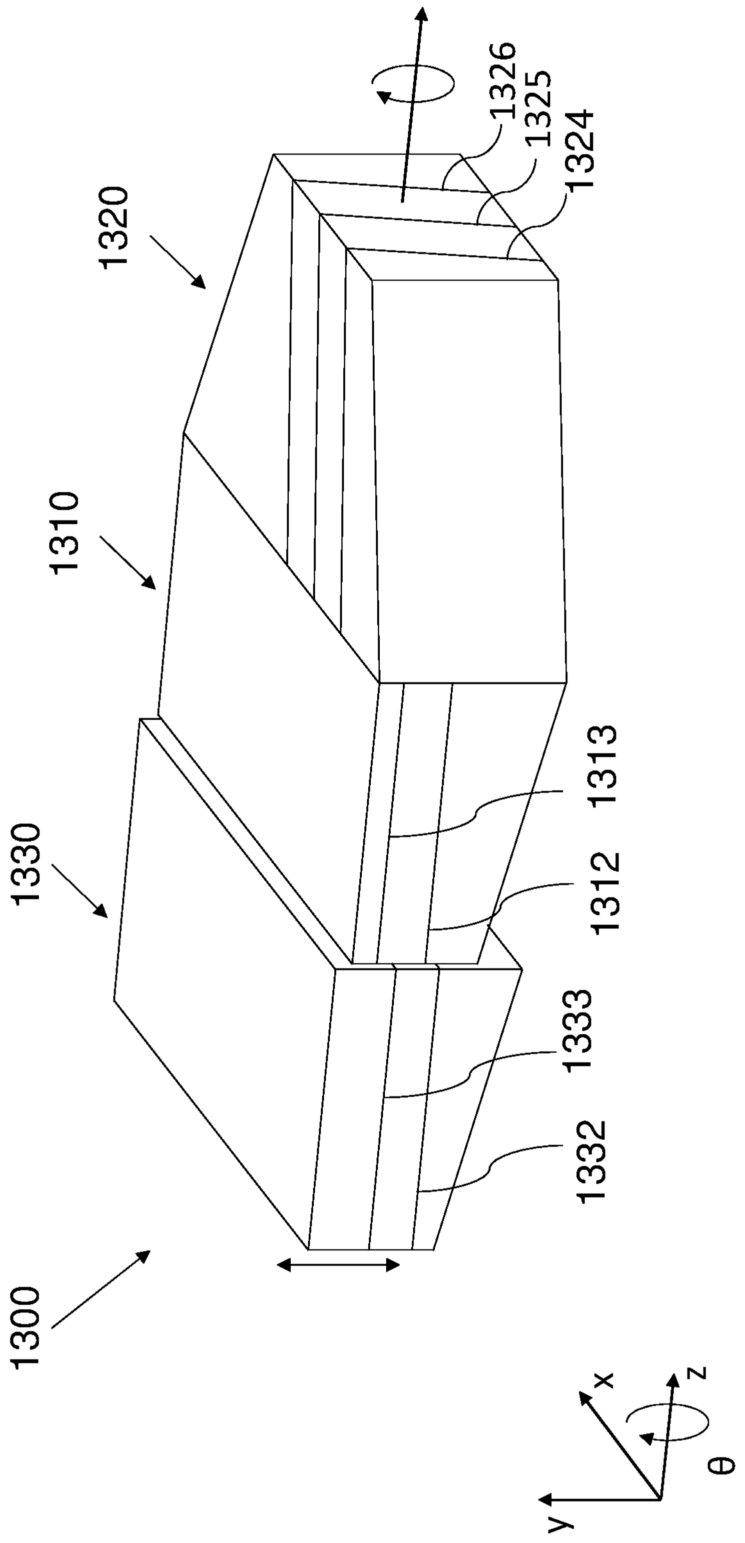
FIG. 9 schematically depicts a complex prism, for which a relative positioning of two sub-prisms needs to be set according to internal surfaces thereof, according to some embodiments.

FIG. 9 schematically depicts, according to some embodiments, an example of a more complex scenario where a composite prism 1300 is composed of three sub-prisms 1310, 1320 and 1330, such that sub-prism 1310 is disposed between sub prism 1320 and sub-prism 1330. Sub-prisms 1310 includes two internal facets 1312 and 1313. Sub-prisms 1320 includes three internal facets 1324, 1325 and 1326. Sub-prisms 1330 includes two internal facets 1332 and 1333. In this particular non-limiting example, the relative positioning of two sub-prisms 1310 and 1330 needs to be set according to internal facets of these prisms, 1332 and 1333 (of sub-prism 1330) and 1312 and 1313 (of sub-prism 1310), and the relative angular orientation of two sub-prisms 1310 and 1320, and optionally also sub-prism 1330, needs to be aligned according to internal facets 1312 and 1313 (of sub-prism 1310) and 1324 and 1326 (of sub-prism 1320). Sub-prisms 1310, 1320 or 1330 may also include internal structures, such as diffractive gratings or partially reflective surfaces.

Figures 10A, 10B, 10C:
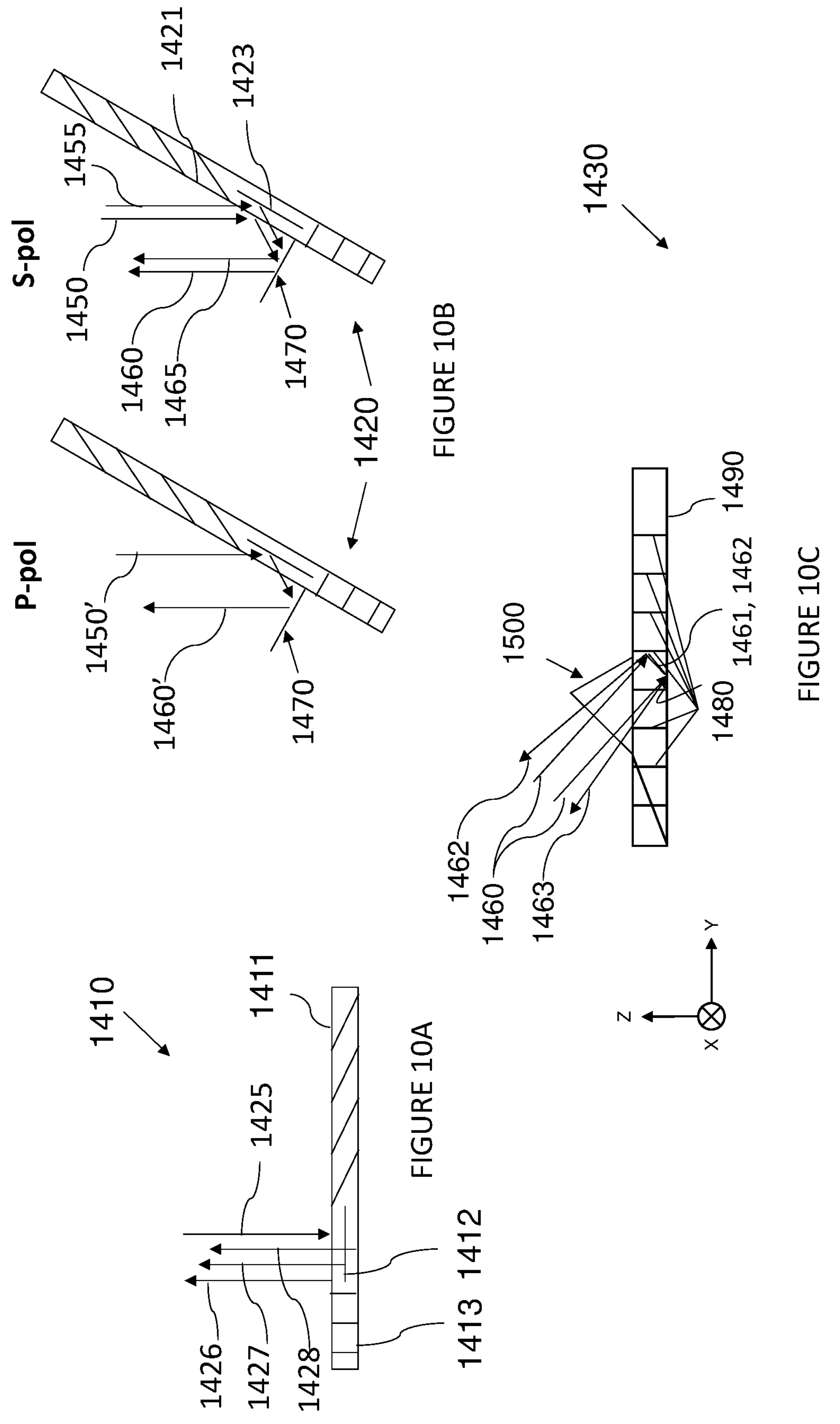
FIG. 10A schematically depicts an optical waveguide structure having an internal facet, which should be validated as parallel to two external surfaces of the structure, according to some embodiments.
FIG. 10B schematically depicts an optical waveguide structure having an internal facet, which should be validated as parallel to an external surface of the structure utilizing polarized light, according to some embodiments.
FIG. 10C schematically depicts an optical waveguide structure having an internal facet, which should be validated as perpendicular to an external surface of the structure, according to some embodiments.

As discussed above in accordance with some embodiments, the methods and system disclosed herein are suitable not only of active alignment of prisms and sub-prisms but also to (passive) measurements of orientation and position of internal and/or external surfaces, specifically in the context of quality analysis of individual optical waveguide structures. FIGS. 10A-10C below provide examples of quality assurance measurements of light-guide optical elements (LOEs).

Reference is now made to FIG. 10A, which schematically depicts an optical waveguide structure 1410 having an internal facet 1412, which should be validated as parallel to two external surfaces 1411 and 1413, according to some embodiments. Collimated light beam/laser 1425 is directed to impinge normally on external surface 1411 of sample 1410 and is transmitted through optical waveguide structure 1410 to nominally normally impinge on internal facet 1412 and surface 1413. Light reflected from surface 1411 is depicted by arrow 1426, light reflected from surface 1412 is depicted by arrow 1427 and light reflected from surface 1413 is depicted by arrow 1428. Relative angle between these surfaces (and/or verification of parallelism therebetween) may be measured according to the above presented methods (for example as described in FIGS. 3A and 3B). According to some embodiments, measurement of these surfaces may also be performed using the methods presented in FIG. 4C.

Reference is now made to FIG. 10B, which schematically depicts an optical waveguide structure 1420 having an internal facet 1423, which should be validated as parallel to an external surface 1421 of the structure utilizing polarized light, according to some embodiments. More specifically, assuming internal facet 1423 has significantly higher reflection than surface 1421 the sample is placed at the angular orientation of the Brewster angle of facet 1423. Then, s-polarized light (indicated by 1450 and 1455) is directed towards surfaces 1421 and 1423 respectively. For s-polarized light from both surfaces 1421 and 1423 is reflected (indicated by 1460 and 1465) but one surface (1423) dominates the detected signal. However, when p-polarized light 1450' is directed towards surfaces 1421 and 1423, only the low-reflectivity surface 1421 reflects light (1460'). The reflected light can be detected by a detector collecting light at the appropriate angle, or by utilizing an optical element such as a mirror 1470 that reflects light back to the source (for instance, when using an autocollimator, not shown). Accordingly, this method may be utilized, in some embodiments, for validation of parallelism between two (or more) surfaces. It is noted that although in this case internal facet 1423 was demonstrated to have higher reflection than surface 1421, the method can be adapted to apply also to a case where the reflectivity of surface 1421 was higher than that of facet 1423. It is further noted that this method may be applied for validation measurement of parallelism between any two (or more) internal facets and/or external surfaces.

Reference is now made to FIG. 10C, which schematically depicts an optical waveguide structure 1430 having internal surfaces 1480, which should be validated as perpendicular to an external surface 1490 of the structure, according to some embodiments. A collimated beam of light represented by rays 1460 impinges on surfaces 1480 and 1490 (via a mediating optical element 1500 which may, in accordance with some embodiments, be similar to mediating optical element 840 of FIG. 5D), and is reflected to rays 1461 and 1462, respectively. Rays 1461 and 1462 are then reflected by surfaces 1490 and 1480, respectively, to rays 1463 and 1462, respectively. If internal surface 1480 is perfectly perpendicular to external surface 1490, rays 1462 and 1463 will be perfectly parallel. However, if the relative angle between internal surface 1480 and external surface 1490 is not perpendicular, rays 1462 and 1463 will not be parallel, and the relative angle between them will indicate the relative orientation of surfaces 1480 and 1490.

Throughout the description, internal, surfaces (such as a flat boundary between two parts of a three-dimensional element or an internal flat layer of material incorporated into a three-dimensional element) of three-dimensional elements are referred to as "internal facets".

As used herein, in accordance with some embodiments, the terms "facet", "internal facet" and "internal surface" are used interchangeably. As used herein, in accordance with some embodiments, the terms "facet", "internal facet", "internal surface", "external surface" and "surface" refer to flat "facet", "internal facet", "internal surface", "external surface" and "surface".

As used herein, in accordance with some embodiments, the terms "measuring" and "sensing" are used interchangeably. Similarly, the terms "sensed data" and "measurement data" (or "measured data") are used interchangeably.

As used herein, in accordance with some embodiments, the terms "complex" and "composite", with respect to an optical element, such as a prism or a waveguide structure, are used interchangeably and may include optical element composed of two or more sub-optical elements and/or may include one or more internal facets (for example, about 10-20, 10-50, 50-100 or more). The one or more internal facets may be co-parallel.

In accordance with some embodiments, the term "bonded" or "bonding" as used herein should be understood to mean attached or attaching with an optical cement or glue, or any other suitable adhesive.

As used herein, in accordance with some embodiments, the terms "optical waveguide structure", "waveguide structure", "refractive complex waveguide structure" and "light-guide optical element (LOE)", are used interchangeably.

As used herein, an object may be said to "nominally" exhibit (i.e., be characterized by) a property, such as an angle between flat surfaces of a sample (such as an optical element), when the object is intended by design and fabrication to exhibit the property but, in practice, due to manufacturing tolerances, the property may actually be imperfectly exhibited.

As used herein, in accordance with some embodiments, the term "laterally overlap" or "laterally overlapping" with respect to two surfaces, may refer to full or partial horizontal overlap, wherein it is understood that the two surfaces are vertically separated.

As used herein, the terms "measuring" and "sensing" are used interchangeably. Similarly, the terms "sensed data" and "measured data" are used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out and/or occurring in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to case understanding of the specification and should not be construed as necessarily limiting.

What is claimed is:

1. A method for producing a composite prism having a plurality of planar external surfaces by aligning and bonding two or more prism components along bonding surfaces thereof, the method comprising stages of:

bringing the bonding surfaces of the first prism component and the second prism component into close proximity or contact;

aligning at least one first surface of the first prism component and at least one second surface of the second prism component, wherein at least one of the first surface and the second surface is an internal facet;

projecting, from a light source, at least one collimated incident light beam, such that a first portion of the at least one collimated incident light beam impinges on the at least one first surface and reflects therefrom, and a second portion of the at least one collimated incident light beam impinges on the at least one second surface and reflects therefrom;

sensing, by a detector, the first portion of the at least one collimated incident light beam reflected to the detector from the at least one first surface and the second portion of the at least one collimated incident light beam reflected to the detector from the at least one second surface, to obtain sensed data;

based on the sensed data, determining an actual relative orientation between the at least one first surface and the at least one second surface; and joining, using a controllably rotatable mechanical axis, the first and second prism components along their bonding surfaces if the difference between the actual relative orientation and an intended relative orientation between the at least one first surface and the at least one second surface is below an accuracy threshold, wherein one or more of the prism components are transparent or semi-transparent.

2. The method of claim 1, wherein the method further comprises realigning the first and second surfaces if the difference between the actual relative orientation and the intended relative orientation between the first and second surfaces is above the accuracy threshold.

3. The method of claim 1, wherein the method further comprises repeating the stages of aligning the first and second surfaces, projecting the at least one collimated incident light beam, and determining the actual relative orientation between the first and second surfaces if the difference between the actual relative orientation and the intended relative orientation between the first and second surfaces is above the accuracy threshold.

4. The method of claim 1, wherein an adhesive is applied between the bonding surfaces prior to the stage of aligning the first and second surfaces, and wherein, if the difference between the actual relative orientation and the intended relative orientation between the first and second surfaces is below the accuracy threshold, the first prism component and the second prism component are cured along the bonding surfaces thereof.

5. The method of claim 1, wherein the at least one collimated incident light beam comprises a first collimated incident light beam and a second collimated incident light beam, the second collimated incident light beam being directed at a first angle relative to the first surface and at a second angle relative to the second surface.

6. The method of claim 1, wherein the at least one collimated incident light beam is monochromatic and coherent.

7. The method of claim 1, wherein the reflected first and second portions of the collimated incident light beam are focused, respectively, onto first and second spots on a photosensitive surface of the detector, and wherein the difference between the actual relative orientation and the intended relative orientation between the first and second surfaces is derived from locations of the first and second spots.

8. The method of claim 1, wherein the at least one collimated incident light beam is coherent and wherein the difference between the actual relative orientation and the intended relative orientation between the first and second surfaces is derived from measuring of an interference pattern of the reflected first and second portions of the at least one collimated incident light beam.

9. The method of claim 1, wherein the first and second surfaces surface are intended to be oriented perpendicularly, or substantially perpendicularly, to one another.

10. The method of claim 1, wherein an angle between the first and second surfaces is intended to be less than about 20 Deg.

11. The method of claim 1, wherein the first and second surfaces are intended to be parallel or substantially parallel to each other.

12. The method of claim 1, wherein the at least one second surface comprises a plurality of internal facets nominally co-parallel, wherein the projecting of the at least one collimated incident light beam and the sensing of the light beams are separately performed on the first surface and each one of the internal facets.

13. The method of claim 1, wherein the first prism and/or the second prism components comprise an embedded internal facet.

14. The method of claim 1, wherein the first and/or second surfaces are coated with a reflective coating.

15. The method of claim 1, wherein the second surface is an embedded internal facet and wherein the method further comprises an initial stage of submerging the composite prism in an immersive medium having a refractive index equal to the second prism component; and/or wherein the second prism component comprises a first sub-prism and a second sub-prism, which are joined, wherein the second surface is an internal facet defined by a boundary between the first sub-prism and the second sub-prism, and wherein the method further comprises an initial stage of immersing the composite prism in a medium having a refractive index equal to the first sub-prism.

16. The method of claim 15, wherein the at least one collimated incident light beam is projected normally to a surface of the immersive medium.

17. The method of claim 16, wherein the second prism component comprises the first sub-prism and the second sub-prism, wherein the first and second portions of the collimated incident light beam propagate, respectively, onto the first and second surfaces, and wherein the second portion of the collimated incident light beam traverses the first sub-prism to reach the second surface.

18. The method of claim 1, further comprising determining a relative position of the first prism component with respect to the second prism component.

19. The method of claim 1, wherein the collimated incident light beam is a polarized light.

20. A system for producing a composite prism having a plurality of planar external surfaces by aligning and bonding two or more prism components along bonding surfaces thereof, the system comprising:

an infrastructure configured to bring the bonding surfaces of the first prism component and the second prism component into close proximity or contact;

a controllably rotatable mechanical axis configured to align at least one first surface of the first prism component and at least one second surface of the second prism component;

a light source configured to project at least one collimated incident light beam, such that a first portion of the at least one collimated incident light beam impinges on the at least one first surface and reflects therefrom, and a second portion of the at least one collimated incident light beam impinges on the at least one second surface and reflects therefrom;

a detector configured to sense the first portion of the at least one collimated incident light beam reflected to the detector from the at least one first surface and the second portion of the at least one collimated incident light beam reflected to the detector from the at least one second surface, to obtain sensed data; and a computational module configured to determine an actual relative orientation between the at least one first surface and the at least one second surface based on the sensed data, and if a difference between the actual relative orientation and an intended relative orientation between the at least one first surface and the at least one second surface is below an accuracy threshold, determine a correction angle for the controllably rotatable mechanical axis, wherein one or more of the prism components are transparent or semi-transparent.

* * * * *